(12) United States Patent
van Datta et al.

(10) Patent No.: US 8,626,584 B2
(45) Date of Patent: Jan. 7, 2014

(54) POPULATION OF AN ADVERTISEMENT REFERENCE LIST

(75) Inventors: Glen van Datta, Foster City, CA (US); Steven Wagner, Foster City, CA (US); Gary M. Zalewski, Foster City, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 1431 days.

(21) Appl. No.: 11/535,370

(22) Filed: Sep. 26, 2006

(65) Prior Publication Data

US 2007/0078989 A1    Apr. 5, 2007

Related U.S. Application Data

(63) Continuation-in-part of application No. 11/241,229, filed on Sep. 30, 2005.

(60) Provisional application No. 60/798,240, filed on May 5, 2006.

(51) Int. Cl.
*G06Q 30/00* (2012.01)

(52) U.S. Cl.
USPC ............ 705/14.4; 705/14.49; 705/14.54; 705/14.58

(58) Field of Classification Search
None
See application file for complete search history.

(56) References Cited

U.S. PATENT DOCUMENTS

| | | | |
|---|---|---|---|
| 4,521,021 A | 6/1985 | Dixon | |
| 4,542,897 A | 9/1985 | Melton et al. | |
| 4,734,690 A | 3/1988 | Waller | |
| 4,807,158 A | 2/1989 | Blanton et al. | |
| 4,905,168 A | 2/1990 | McCarthy et al. | |
| 4,926,255 A | 5/1990 | Von Kohorn | |
| 4,969,036 A | 11/1990 | Bhanu et al. | |
| 5,014,234 A | 5/1991 | Edwards, Jr. | |

(Continued)

FOREIGN PATENT DOCUMENTS

| CA | 2106122 A1 | 3/1994 |
|---|---|---|
| EP | 0 337 539 A2 | 10/1989 |

(Continued)

OTHER PUBLICATIONS

Business Wire, "Juno launches America's first free Internet e-mail service; Initial advertisers include Land's End, Miramax and Snapple," Apr. 19, 1996.

(Continued)

*Primary Examiner* — James W Myhre
*Assistant Examiner* — Krishan Mittal
(74) *Attorney, Agent, or Firm* — Lewis Roca Rothgerber LLP

(57) ABSTRACT

A list of advertisements, products, or services for which an impression is generated during the course of a digital environment session (e.g., a video game) may be imported to a list that may be viewed at the conclusion of the digital session. The user may then visit advertiser web sites and/or view/purchase products at their leisure instead of while immersed in the digital experience. Similarly, a list of all advertisements through which an interaction occurred during the course of a video game experience (e.g., physical encounter, purchase of an in-game product, utilizing a sponsored product) may be imported to a list that may be viewed at the conclusion of a game session. The user may then visit the advertiser web sites and/or view/purchase products at their leisure instead of while immersed in the digital environment.

55 Claims, 6 Drawing Sheets

(56) References Cited

U.S. PATENT DOCUMENTS

| | | |
|---|---|---|
| 5,083,271 A | 1/1992 | Thacher et al. |
| 5,105,184 A | 4/1992 | Pirani et al. |
| 5,227,874 A | 7/1993 | Von Kohorn |
| 5,231,568 A | 7/1993 | Cohen et al. |
| 5,283,731 A | 2/1994 | Lalonde et al. |
| 5,305,195 A | 4/1994 | Murphy |
| 5,305,389 A | 4/1994 | Palmer |
| 5,319,454 A | 6/1994 | Schutte |
| 5,347,632 A | 9/1994 | Filepp et al. |
| 5,373,440 A | 12/1994 | Cohen et al. |
| 5,377,997 A | 1/1995 | Wilden et al. |
| 5,446,919 A | 8/1995 | Wilkins |
| 5,462,275 A | 10/1995 | Lowe et al. |
| 5,497,479 A | 3/1996 | Hornbuckle |
| 5,512,935 A | 4/1996 | Majeti et al. |
| 5,526,041 A | 6/1996 | Glatt |
| 5,539,450 A | 7/1996 | Handelman |
| 5,548,645 A | 8/1996 | Ananda |
| 5,564,038 A | 10/1996 | Grantz et al. |
| 5,565,909 A | 10/1996 | Thibadeau et al. |
| 5,572,643 A | 11/1996 | Judson |
| 5,592,212 A | 1/1997 | Handelman |
| 5,630,757 A | 5/1997 | Gagin et al. |
| 5,636,346 A | 6/1997 | Saxe |
| 5,663,757 A | 9/1997 | Morales |
| 5,684,526 A | 11/1997 | Yoshinobu |
| 5,697,844 A | 12/1997 | Von Kohorn |
| 5,699,497 A | 12/1997 | Erdahl et al. |
| 5,707,289 A | 1/1998 | Watanabe et al. |
| 5,712,979 A | 1/1998 | Graber et al. |
| 5,721,827 A | 2/1998 | Logan et al. |
| 5,724,521 A | 3/1998 | Dedrick |
| 5,737,619 A | 4/1998 | Judson |
| 5,748,867 A | 5/1998 | Cosman et al. |
| 5,751,956 A | 5/1998 | Kirsch |
| 5,758,068 A | 5/1998 | Brandt et al. |
| 5,758,257 A | 5/1998 | Herz et al. |
| 5,771,347 A | 6/1998 | Grantz et al. |
| 5,774,170 A | 6/1998 | Hite et al. |
| 5,794,210 A | 8/1998 | Goldhaber et al. |
| 5,798,519 A | 8/1998 | Vock et al. |
| 5,805,815 A | 9/1998 | Hill |
| 5,822,523 A | 10/1998 | Rothschild et al. |
| 5,848,396 A | 12/1998 | Gerace |
| 5,855,008 A | 12/1998 | Goldhaber et al. |
| 5,857,149 A | 1/1999 | Suzuki |
| 5,860,073 A | 1/1999 | Ferrel et al. |
| 5,867,208 A | 2/1999 | McLaren |
| 5,876,286 A | 3/1999 | Lee |
| 5,879,235 A | 3/1999 | Kaneko et al. |
| 5,903,816 A | 5/1999 | Broadwin et al. |
| 5,910,987 A | 6/1999 | Ginter et al. |
| 5,911,582 A | 6/1999 | Redford |
| 5,916,024 A | 6/1999 | Von Kohorn |
| 5,917,725 A | 6/1999 | Thacher et al. |
| 5,929,850 A | 7/1999 | Broadwin et al. |
| 5,937,037 A | 8/1999 | Kamel et al. |
| 5,946,646 A | 8/1999 | Schena et al. |
| 5,946,664 A | 8/1999 | Ebisawa |
| 5,948,061 A | 9/1999 | Merriman et al. |
| 5,964,660 A | 10/1999 | James et al. |
| 5,970,143 A | 10/1999 | Schneier et al. |
| 5,974,398 A | 10/1999 | Hanson et al. |
| 5,987,511 A | 11/1999 | Elixmann et al. |
| 5,991,735 A | 11/1999 | Gerace |
| 6,005,602 A | 12/1999 | Matthews, III |
| 6,012,984 A | 1/2000 | Roseman |
| 6,015,348 A | 1/2000 | Lambright et al. |
| 6,020,883 A | 2/2000 | Herz et al. |
| 6,024,643 A | 2/2000 | Begis |
| 6,026,368 A | 2/2000 | Brown et al. |
| 6,029,046 A | 2/2000 | Khan et al. |
| 6,036,601 A * | 3/2000 | Heckel .................. 463/42 |
| 6,047,289 A | 4/2000 | Thorne et al. |
| 6,088,722 A | 7/2000 | Herz et al. |
| 6,108,637 A | 8/2000 | Blumenau |
| 6,113,494 A | 9/2000 | Lennert |
| 6,119,098 A | 9/2000 | Guyot et al. |
| 6,149,519 A | 11/2000 | Osaki et al. |
| 6,151,631 A | 11/2000 | Ansell et al. |
| 6,165,070 A | 12/2000 | Nolte et al. |
| 6,179,713 B1 | 1/2001 | James et al. |
| 6,181,988 B1 | 1/2001 | Schneider et al. |
| 6,196,920 B1 | 3/2001 | Spaur et al. |
| 6,199,082 B1 | 3/2001 | Ferrel et al. |
| 6,216,129 B1 | 4/2001 | Eldering |
| 6,236,975 B1 | 5/2001 | Boe et al. |
| 6,238,290 B1 | 5/2001 | Tarr et al. |
| 6,251,017 B1 | 6/2001 | Leason et al. |
| 6,263,360 B1 | 7/2001 | Arnold et al. |
| 6,264,555 B1 | 7/2001 | Glazman et al. |
| 6,264,560 B1 | 7/2001 | Goldberg et al. |
| 6,267,672 B1 | 7/2001 | Vance |
| 6,267,675 B1 | 7/2001 | Lee |
| 6,275,854 B1 | 8/2001 | Himmel et al. |
| 6,275,989 B1 | 8/2001 | Broadwin et al. |
| 6,298,348 B1 | 10/2001 | Eldering |
| 6,308,328 B1 | 10/2001 | Bowcutt et al. |
| 6,312,337 B1 | 11/2001 | Edwards et al. |
| 6,320,495 B1 | 11/2001 | Sporgis |
| 6,324,519 B1 | 11/2001 | Eldering |
| 6,343,990 B1 | 2/2002 | Rasmussen et al. |
| 6,346,045 B2 | 2/2002 | Rider et al. |
| 6,366,701 B1 | 4/2002 | Chalom et al. |
| 6,371,850 B1 | 4/2002 | Sonoda |
| 6,379,251 B1 | 4/2002 | Auxier et al. |
| 6,381,362 B1 | 4/2002 | Deshpande et al. |
| 6,385,592 B1 | 5/2002 | Angles et al. |
| 6,390,922 B1 | 5/2002 | Vange et al. |
| 6,393,574 B1 | 5/2002 | Kashiwagi et al. |
| 6,394,899 B1 | 5/2002 | Walker |
| 6,400,996 B1 | 6/2002 | Hoffberg et al. |
| 6,411,936 B1 | 6/2002 | Sanders |
| 6,434,614 B1 | 8/2002 | Blumenau |
| 6,443,843 B1 | 9/2002 | Walker et al. |
| 6,446,130 B1 | 9/2002 | Grapes |
| 6,446,261 B1 | 9/2002 | Rosser |
| 6,456,234 B1 | 9/2002 | Johnson |
| 6,457,010 B1 | 9/2002 | Eldering et al. |
| 6,460,036 B1 | 10/2002 | Herz |
| 6,468,155 B1 | 10/2002 | Zucker et al. |
| 6,470,138 B1 | 10/2002 | Um et al. |
| 6,484,148 B1 | 11/2002 | Boyd |
| 6,484,149 B1 | 11/2002 | Jammes et al. |
| 6,489,955 B1 | 12/2002 | Newhall, Jr. |
| 6,496,826 B1 | 12/2002 | Chowdhury et al. |
| 6,513,160 B2 | 1/2003 | Dureau |
| 6,516,338 B1 | 2/2003 | Landsman et al. |
| 6,529,940 B1 | 3/2003 | Humble |
| 6,530,840 B1 | 3/2003 | Cuomo et al. |
| 6,532,448 B1 | 3/2003 | Higginson et al. |
| 6,539,375 B2 | 3/2003 | Kawasaki |
| 6,539,544 B2 | 3/2003 | Ebisawa |
| 6,553,178 B2 | 4/2003 | Abecassis |
| 6,560,578 B2 | 5/2003 | Eldering |
| 6,563,523 B1 | 5/2003 | Suchocki et al. |
| 6,564,217 B2 | 5/2003 | Bunney et al. |
| 6,595,859 B2 | 7/2003 | Lynn |
| 6,606,746 B1 | 8/2003 | Zdepski et al. |
| 6,611,813 B1 | 8/2003 | Bratton |
| 6,611,957 B2 | 8/2003 | Ebisawa |
| 6,612,932 B2 | 9/2003 | Stern |
| 6,615,039 B1 | 9/2003 | Eldering |
| 6,616,533 B1 | 9/2003 | Rashkovskiy |
| 6,625,578 B2 | 9/2003 | Spaur et al. |
| 6,632,138 B1 | 10/2003 | Serizawa et al. |
| 6,640,097 B2 | 10/2003 | Corrigan et al. |
| 6,640,335 B2 | 10/2003 | Ebisawa |
| 6,640,336 B1 | 10/2003 | Ebisawa |
| 6,645,068 B1 | 11/2003 | Petermeier et al. |
| 6,654,725 B1 | 11/2003 | Langheinrich et al. |
| 6,656,050 B2 | 12/2003 | Busch et al. |
| 6,659,861 B1 | 12/2003 | Faris et al. |
| 6,663,105 B1 | 12/2003 | Sullivan et al. |

(56) References Cited

U.S. PATENT DOCUMENTS

| | | |
|---|---|---|
| 6,669,562 B1 | 12/2003 | Shiino |
| 6,669,564 B1 | 12/2003 | Young et al. |
| 6,680,746 B2 | 1/2004 | Kawai et al. |
| 6,683,941 B2 | 1/2004 | Brown et al. |
| 6,684,194 B1 | 1/2004 | Eldering et al. |
| 6,687,608 B2 | 2/2004 | Sugimoto et al. |
| 6,697,792 B2 | 2/2004 | Bunney et al. |
| 6,698,020 B1 | 2/2004 | Zigmond et al. |
| 6,699,127 B1 | 3/2004 | Lobb et al. |
| 6,701,363 B1 | 3/2004 | Chiu et al. |
| 6,704,930 B1 | 3/2004 | Eldering et al. |
| 6,709,335 B2 | 3/2004 | Bates et al. |
| 6,712,702 B2 * | 3/2004 | Goldberg et al. ............... 463/42 |
| 6,714,236 B1 | 3/2004 | Wada et al. |
| 6,714,723 B2 | 3/2004 | Abecassis |
| 6,714,917 B1 | 3/2004 | Eldering et al. |
| 6,716,103 B1 | 4/2004 | Eck et al. |
| 6,718,551 B1 | 4/2004 | Swix et al. |
| 6,721,748 B1 | 4/2004 | Knight et al. |
| 6,731,238 B2 | 5/2004 | Johnson |
| 6,738,078 B1 | 5/2004 | Duncombe |
| 6,745,011 B1 | 6/2004 | Hendrickson et al. |
| 6,757,740 B1 | 6/2004 | Parekh et al. |
| 6,758,746 B1 | 7/2004 | Hunter et al. |
| 6,758,754 B1 | 7/2004 | Lavanchy et al. |
| 6,758,755 B2 | 7/2004 | Kelly et al. |
| 6,764,395 B1 | 7/2004 | Guyett |
| 6,764,403 B2 | 7/2004 | Gavin |
| 6,771,290 B1 | 8/2004 | Hoyle |
| 6,783,460 B2 | 8/2004 | Galyean, III et al. |
| 6,785,902 B1 | 8/2004 | Zigmond et al. |
| 6,814,663 B2 | 11/2004 | Edwards et al. |
| 6,820,277 B1 | 11/2004 | Eldering et al. |
| 6,827,645 B2 | 12/2004 | Morita et al. |
| 6,840,861 B2 | 1/2005 | Jordan et al. |
| 6,863,612 B2 | 3/2005 | Willis |
| 6,874,683 B2 | 4/2005 | Keronen et al. |
| 6,882,978 B2 | 4/2005 | Ebisawa |
| 6,890,256 B2 | 5/2005 | Walker et al. |
| 6,895,170 B1 | 5/2005 | Lambert et al. |
| 6,912,398 B1 | 6/2005 | Domnitz |
| 6,928,414 B1 | 8/2005 | Kim |
| 6,941,574 B1 | 9/2005 | Broadwin et al. |
| 6,942,575 B2 | 9/2005 | Mergler |
| 6,954,728 B1 | 10/2005 | Kusumoto |
| 6,955,605 B2 | 10/2005 | Young et al. |
| 6,964,608 B1 | 11/2005 | Koza |
| 6,967,566 B2 | 11/2005 | Weston et al. |
| 6,968,567 B1 | 11/2005 | Gordon et al. |
| 6,970,834 B2 | 11/2005 | Martin et al. |
| 6,970,915 B1 | 11/2005 | Partovi et al. |
| 6,973,664 B2 | 12/2005 | Fries |
| 6,987,221 B2 | 1/2006 | Platt |
| 6,995,788 B2 | 2/2006 | James |
| 7,028,082 B1 | 4/2006 | Rosenberg et al. |
| 7,072,849 B1 | 7/2006 | Filepp et al. |
| 7,086,187 B2 * | 8/2006 | Bandak ............................. 40/453 |
| 7,305,442 B1 | 12/2007 | Lundy |
| 7,362,999 B2 | 4/2008 | Petschke et al. |
| 7,363,643 B2 | 4/2008 | Drake et al. |
| 7,370,002 B2 | 5/2008 | Heckerman et al. |
| 7,386,127 B2 | 6/2008 | Bar-On |
| 7,401,140 B2 | 7/2008 | Goulden et al. |
| 7,437,368 B1 | 10/2008 | Kolluri et al. |
| 7,466,823 B2 | 12/2008 | Vestergaard et al. |
| 7,487,112 B2 | 2/2009 | Barnes, Jr. |
| 7,594,189 B1 | 9/2009 | Walker et al. |
| 8,005,713 B1 | 8/2011 | Sanz-Pastor et al. |
| 8,024,766 B2 | 9/2011 | Addington |
| 8,074,076 B2 | 12/2011 | Courtois |
| 8,175,921 B1 | 5/2012 | Kopra |
| 8,191,088 B2 | 5/2012 | Edwards et al. |
| 8,267,783 B2 | 9/2012 | van Datta |
| 8,272,964 B2 | 9/2012 | van Datta |
| 8,302,030 B2 | 10/2012 | Soroca et al. |
| 2001/0011226 A1 | 8/2001 | Greer et al. |
| 2001/0013009 A1 | 8/2001 | Greening et al. |
| 2001/0014915 A1 | 8/2001 | Blumenau |
| 2001/0025245 A1 | 9/2001 | Flickinger et al. |
| 2001/0025254 A1 | 9/2001 | Park |
| 2001/0025274 A1 | 9/2001 | Zehr et al. |
| 2001/0027412 A1 | 10/2001 | Son |
| 2001/0032125 A1 | 10/2001 | Bhan et al. |
| 2001/0032132 A1 | 10/2001 | Moran |
| 2001/0032133 A1 | 10/2001 | Moran |
| 2001/0032137 A1 | 10/2001 | Bennett et al. |
| 2001/0032333 A1 | 10/2001 | Flickinger |
| 2001/0034643 A1 | 10/2001 | Acres |
| 2001/0034762 A1 | 10/2001 | Jacobs et al. |
| 2001/0037232 A1 | 11/2001 | Miller |
| 2001/0039210 A1 | 11/2001 | St-Denis |
| 2001/0049620 A1 | 12/2001 | Blasko |
| 2001/0052123 A1 | 12/2001 | Kawai |
| 2002/0004743 A1 | 1/2002 | Kutaragi et al. |
| 2002/0004744 A1 | 1/2002 | Muyres et al. |
| 2002/0007307 A1 | 1/2002 | Miller et al. |
| 2002/0007310 A1 | 1/2002 | Long |
| 2002/0010626 A1 | 1/2002 | Agmoni |
| 2002/0010628 A1 | 1/2002 | Burns |
| 2002/0010757 A1 | 1/2002 | Granik et al. |
| 2002/0013174 A1 | 1/2002 | Murata |
| 2002/0018076 A1 | 2/2002 | Gianola |
| 2002/0018982 A1 | 2/2002 | Conroy |
| 2002/0019774 A1 | 2/2002 | Kanter |
| 2002/0022476 A1 | 2/2002 | Go |
| 2002/0022516 A1 | 2/2002 | Forden |
| 2002/0023000 A1 | 2/2002 | Bollay |
| 2002/0026345 A1 | 2/2002 | Juels |
| 2002/0026355 A1 | 2/2002 | Mitsuoka et al. |
| 2002/0026638 A1 | 2/2002 | Eldering et al. |
| 2002/0032608 A1 | 3/2002 | Kanter |
| 2002/0032626 A1 | 3/2002 | DeWolf et al. |
| 2002/0032906 A1 | 3/2002 | Grossman |
| 2002/0044687 A1 | 4/2002 | Federman |
| 2002/0046087 A1 | 4/2002 | Hey |
| 2002/0046095 A1 | 4/2002 | Wallace |
| 2002/0046102 A1 | 4/2002 | Dohring et al. |
| 2002/0049968 A1 | 4/2002 | Wilson et al. |
| 2002/0051521 A1 | 5/2002 | Patrick |
| 2002/0055833 A1 | 5/2002 | Sterling |
| 2002/0055876 A1 | 5/2002 | Gabler |
| 2002/0056107 A1 | 5/2002 | Schlack |
| 2002/0059577 A1 | 5/2002 | Lu et al. |
| 2002/0059590 A1 | 5/2002 | Kitsukawa et al. |
| 2002/0061778 A1 | 5/2002 | Acres |
| 2002/0067730 A1 | 6/2002 | Hinderks et al. |
| 2002/0069240 A1 | 6/2002 | Berk |
| 2002/0069405 A1 | 6/2002 | Chapin et al. |
| 2002/0072965 A1 | 6/2002 | Merriman et al. |
| 2002/0072966 A1 | 6/2002 | Eldering et al. |
| 2002/0073235 A1 | 6/2002 | Chen et al. |
| 2002/0077906 A1 | 6/2002 | Remler |
| 2002/0078441 A1 | 6/2002 | Drake et al. |
| 2002/0082077 A1 | 6/2002 | Johnson et al. |
| 2002/0082910 A1 | 6/2002 | Kontogouris |
| 2002/0082913 A1 | 6/2002 | Li |
| 2002/0082941 A1 | 6/2002 | Bird |
| 2002/0083435 A1 | 6/2002 | Blasko et al. |
| 2002/0083439 A1 | 6/2002 | Eldering |
| 2002/0083441 A1 | 6/2002 | Flickinger et al. |
| 2002/0083442 A1 | 6/2002 | Eldering |
| 2002/0083443 A1 | 6/2002 | Eldering et al. |
| 2002/0083444 A1 | 6/2002 | Blasko et al. |
| 2002/0083445 A1 | 6/2002 | Flickinger et al. |
| 2002/0083451 A1 | 6/2002 | Gill et al. |
| 2002/0087402 A1 | 7/2002 | Zustak |
| 2002/0087403 A1 | 7/2002 | Meyers et al. |
| 2002/0087887 A1 | 7/2002 | Busam et al. |
| 2002/0087973 A1 | 7/2002 | Hamilton et al. |
| 2002/0087975 A1 | 7/2002 | Schlack |
| 2002/0087980 A1 | 7/2002 | Eldering et al. |
| 2002/0094868 A1 | 7/2002 | Tuck et al. |
| 2002/0095676 A1 | 7/2002 | Knee et al. |
| 2002/0098891 A1 | 7/2002 | Graham et al. |

(56) References Cited

U.S. PATENT DOCUMENTS

| | | |
|---|---|---|
| 2002/0099600 A1 | 7/2002 | Merriman et al. |
| 2002/0099611 A1 | 7/2002 | De Souza et al. |
| 2002/0099653 A1 | 7/2002 | De Souza et al. |
| 2002/0100040 A1 | 7/2002 | Bull |
| 2002/0107073 A1 | 8/2002 | Binney |
| 2002/0107075 A1 | 8/2002 | Stephan |
| 2002/0107730 A1 | 8/2002 | Bernstein |
| 2002/0109680 A1 | 8/2002 | Orbanes et al. |
| 2002/0111154 A1 | 8/2002 | Eldering et al. |
| 2002/0111172 A1 | 8/2002 | DeWolf et al. |
| 2002/0111825 A1 | 8/2002 | Martin et al. |
| 2002/0111865 A1 | 8/2002 | Middleton, III et al. |
| 2002/0112035 A1 | 8/2002 | Carey et al. |
| 2002/0112233 A1 | 8/2002 | Cantu Bonilla et al. |
| 2002/0112240 A1 | 8/2002 | Bacso et al. |
| 2002/0112249 A1 | 8/2002 | Hendricks et al. |
| 2002/0112250 A1 | 8/2002 | Koplar et al. |
| 2002/0114466 A1 | 8/2002 | Tanaka et al. |
| 2002/0116284 A1 | 8/2002 | Steelman et al. |
| 2002/0120589 A1 | 8/2002 | Aoki |
| 2002/0122052 A1 | 9/2002 | Reich et al. |
| 2002/0123928 A1 | 9/2002 | Eldering et al. |
| 2002/0129368 A1 | 9/2002 | Schlack et al. |
| 2002/0133398 A1 | 9/2002 | Geller et al. |
| 2002/0136407 A1 | 9/2002 | Denning et al. |
| 2002/0138493 A1 | 9/2002 | Shapiro et al. |
| 2002/0143639 A1 | 10/2002 | Beckett et al. |
| 2002/0143652 A1 | 10/2002 | Beckett |
| 2002/0143901 A1 | 10/2002 | Lupo et al. |
| 2002/0144262 A1 | 10/2002 | Plotnick et al. |
| 2002/0144263 A1 | 10/2002 | Eldering et al. |
| 2002/0147633 A1 | 10/2002 | Rafizadeh |
| 2002/0147638 A1 | 10/2002 | Banerjee et al. |
| 2002/0147645 A1 | 10/2002 | Alao et al. |
| 2002/0152117 A1 | 10/2002 | Cristofalo et al. |
| 2002/0155878 A1 | 10/2002 | Lert, Jr. et al. |
| 2002/0155891 A1 | 10/2002 | Okada et al. |
| 2002/0157002 A1 | 10/2002 | Messerges et al. |
| 2002/0161625 A1 | 10/2002 | Brito-Valladares et al. |
| 2002/0161639 A1 | 10/2002 | Goldstein |
| 2002/0164977 A1 | 11/2002 | Link, II et al. |
| 2002/0164999 A1 | 11/2002 | Johnson |
| 2002/0165026 A1 | 11/2002 | Perkins et al. |
| 2002/0165764 A1 | 11/2002 | Wade et al. |
| 2002/0173349 A1 | 11/2002 | Ach, III |
| 2002/0173359 A1 | 11/2002 | Gallo et al. |
| 2002/0175936 A1 | 11/2002 | Tenembaum |
| 2002/0178442 A1 | 11/2002 | Williams |
| 2002/0178445 A1 | 11/2002 | Eldering et al. |
| 2002/0178447 A1 | 11/2002 | Plotnick et al. |
| 2002/0184047 A1 | 12/2002 | Plotnick et al. |
| 2002/0184086 A1 | 12/2002 | Linde |
| 2002/0184088 A1 | 12/2002 | Rosenberg |
| 2002/0184130 A1 | 12/2002 | Blasko |
| 2002/0184642 A1 | 12/2002 | Lude et al. |
| 2002/0193066 A1 | 12/2002 | Connelly |
| 2002/0194058 A1 | 12/2002 | Eldering |
| 2002/0194585 A1 | 12/2002 | Connelly |
| 2002/0194590 A1 | 12/2002 | Pong |
| 2002/0194598 A1 | 12/2002 | Connelly |
| 2002/0194607 A1 | 12/2002 | Connelly |
| 2003/0004810 A1 | 1/2003 | Eldering |
| 2003/0009762 A1 | 1/2003 | Hooper et al. |
| 2003/0014307 A1 | 1/2003 | Heng |
| 2003/0014312 A1 | 1/2003 | Fleisher |
| 2003/0014414 A1 | 1/2003 | Newman |
| 2003/0014754 A1 | 1/2003 | Chang |
| 2003/0018527 A1 | 1/2003 | Filepp et al. |
| 2003/0018797 A1 | 1/2003 | Dunning et al. |
| 2003/0028433 A1 | 2/2003 | Merriman et al. |
| 2003/0033405 A1 | 2/2003 | Perdon et al. |
| 2003/0035075 A1 | 2/2003 | Butler et al. |
| 2003/0036944 A1 | 2/2003 | Lesandrini et al. |
| 2003/0046148 A1 | 3/2003 | Rizzi et al. |
| 2003/0048293 A1 | 3/2003 | Werkhoven |
| 2003/0054888 A1 | 3/2003 | Walker et al. |
| 2003/0060247 A1 | 3/2003 | Goldberg et al. |
| 2003/0066092 A1 | 4/2003 | Wagner et al. |
| 2003/0070167 A1 | 4/2003 | Holtz et al. |
| 2003/0073496 A1 | 4/2003 | D'Amico et al. |
| 2003/0074252 A1 | 4/2003 | Chandler-Pepelnjak et al. |
| 2003/0076347 A1 | 4/2003 | Barrett et al. |
| 2003/0079226 A1 | 4/2003 | Barrett |
| 2003/0084449 A1 | 5/2003 | Chane et al. |
| 2003/0084456 A1 | 5/2003 | Ryan et al. |
| 2003/0093311 A1 | 5/2003 | Knowlson |
| 2003/0100375 A1 | 5/2003 | Wakae et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0103644 A1* | 6/2003 | Klayh ............................ 382/100 |
| 2003/0104867 A1 | 6/2003 | Kobayashi et al. |
| 2003/0110171 A1* | 6/2003 | Ozer et al. ......................... 707/10 |
| 2003/0115074 A1 | 6/2003 | Freeman et al. |
| 2003/0115318 A1 | 6/2003 | Wueste |
| 2003/0115587 A1 | 6/2003 | Kendall et al. |
| 2003/0126150 A1 | 7/2003 | Chan |
| 2003/0135513 A1 | 7/2003 | Quinn et al. |
| 2003/0139966 A1 | 7/2003 | Sirota et al. |
| 2003/0144044 A1 | 7/2003 | Pisarsky |
| 2003/0144048 A1 | 7/2003 | Silva |
| 2003/0149618 A1 | 8/2003 | Sender et al. |
| 2003/0149623 A1 | 8/2003 | Chen |
| 2003/0149975 A1 | 8/2003 | Eldering et al. |
| 2003/0158872 A1 | 8/2003 | Adams |
| 2003/0163369 A1 | 8/2003 | Arr |
| 2003/0163482 A1 | 8/2003 | Bunney et al. |
| 2003/0171988 A1 | 9/2003 | Sugihara |
| 2003/0171990 A1 | 9/2003 | Rao et al. |
| 2003/0172376 A1 | 9/2003 | Coffin, III |
| 2003/0182567 A1 | 9/2003 | Barton et al. |
| 2003/0182663 A1 | 9/2003 | Gudorf et al. |
| 2003/0187719 A1 | 10/2003 | Brocklebank |
| 2003/0190961 A1 | 10/2003 | Seidman |
| 2003/0191690 A1 | 10/2003 | McIntyre et al. |
| 2003/0191742 A1 | 10/2003 | Yonezawa et al. |
| 2003/0195021 A1 | 10/2003 | Yamashita et al. |
| 2003/0195801 A1 | 10/2003 | Takakura et al. |
| 2003/0195837 A1 | 10/2003 | Kostic et al. |
| 2003/0199292 A1 | 10/2003 | Greenberg |
| 2003/0200452 A1 | 10/2003 | Tagawa et al. |
| 2003/0204632 A1 | 10/2003 | Willebeek-LeMair et al. |
| 2003/0212608 A1 | 11/2003 | Cliff |
| 2003/0215211 A1 | 11/2003 | Coffin, III |
| 2003/0216961 A1 | 11/2003 | Barry |
| 2003/0226141 A1 | 12/2003 | Krasnow et al. |
| 2003/0226142 A1 | 12/2003 | Rand |
| 2003/0229893 A1 | 12/2003 | Sgaraglino |
| 2004/0002380 A1 | 1/2004 | Brosnan et al. |
| 2004/0003396 A1 | 1/2004 | Babu |
| 2004/0014454 A1 | 1/2004 | Burgess et al. |
| 2004/0015397 A1 | 1/2004 | Barry et al. |
| 2004/0015608 A1 | 1/2004 | Ellis et al. |
| 2004/0019521 A1 | 1/2004 | Birmingham |
| 2004/0025174 A1 | 2/2004 | Cerrato |
| 2004/0030595 A1 | 2/2004 | Park |
| 2004/0034536 A1 | 2/2004 | Hughes |
| 2004/0034686 A1 | 2/2004 | Guthrie |
| 2004/0039648 A1 | 2/2004 | Candelore et al. |
| 2004/0039796 A1 | 2/2004 | Watkins |
| 2004/0043817 A1 | 3/2004 | Willis |
| 2004/0043819 A1 | 3/2004 | Willis |
| 2004/0044567 A1 | 3/2004 | Willis |
| 2004/0044569 A1 | 3/2004 | Roberts et al. |
| 2004/0044571 A1 | 3/2004 | Bronnimann et al. |
| 2004/0044574 A1 | 3/2004 | Cochran et al. |
| 2004/0054589 A1 | 3/2004 | Nicholas et al. |
| 2004/0057348 A1 | 3/2004 | Shteyn et al. |
| 2004/0059625 A1 | 3/2004 | Schrader |
| 2004/0068552 A1 | 4/2004 | Kotz et al. |
| 2004/0073482 A1 | 4/2004 | Wiggins et al. |
| 2004/0078263 A1 | 4/2004 | Altieri |
| 2004/0078266 A1 | 4/2004 | Kim |
| 2004/0078292 A1 | 4/2004 | Blumenau |

(56) References Cited

U.S. PATENT DOCUMENTS

| | | |
|---|---|---|
| 2004/0078809 A1 | 4/2004 | Drazin |
| 2004/0083133 A1 | 4/2004 | Nicholas et al. |
| 2004/0088583 A1 | 5/2004 | Yoon et al. |
| 2004/0102248 A1 | 5/2004 | Young et al. |
| 2004/0103429 A1 | 5/2004 | Carlucci et al. |
| 2004/0107136 A1 | 6/2004 | Nemirofsky et al. |
| 2004/0110565 A1 | 6/2004 | Levesque |
| 2004/0111317 A1 | 6/2004 | Ebisawa |
| 2004/0111484 A1 | 6/2004 | Young et al. |
| 2004/0116183 A1 | 6/2004 | Prindle |
| 2004/0117272 A1 | 6/2004 | Shehab |
| 2004/0121835 A1 | 6/2004 | Willis et al. |
| 2004/0121842 A1 | 6/2004 | Willis et al. |
| 2004/0126747 A1 | 7/2004 | Fujisawa et al. |
| 2004/0133480 A1 | 7/2004 | Domes |
| 2004/0133518 A1 | 7/2004 | Dryall |
| 2004/0137980 A1 | 7/2004 | Aenlle |
| 2004/0139465 A1 | 7/2004 | Matthews, III et al. |
| 2004/0140352 A1 | 7/2004 | Walker et al. |
| 2004/0143478 A1 | 7/2004 | Ward |
| 2004/0143495 A1 | 7/2004 | Koenig |
| 2004/0148221 A1 | 7/2004 | Chu |
| 2004/0148424 A1 | 7/2004 | Berkson et al. |
| 2004/0148625 A1 | 7/2004 | Eldering et al. |
| 2004/0152517 A1 | 8/2004 | Hardisty et al. |
| 2004/0152518 A1 | 8/2004 | Kogo |
| 2004/0153360 A1 | 8/2004 | Schumann |
| 2004/0153363 A1 | 8/2004 | Stehling |
| 2004/0153385 A1 | 8/2004 | Allibhoy et al. |
| 2004/0153453 A1 | 8/2004 | Brodie et al. |
| 2004/0158858 A1 | 8/2004 | Paxton |
| 2004/0162758 A1 | 8/2004 | Willis |
| 2004/0162759 A1 | 8/2004 | Willis |
| 2004/0163101 A1 | 8/2004 | Swix et al. |
| 2004/0163134 A1 | 8/2004 | Willis |
| 2004/0168063 A1 | 8/2004 | Revital et al. |
| 2004/0168202 A1 | 8/2004 | Ebihara |
| 2004/0169678 A1 | 9/2004 | Oliver |
| 2004/0172324 A1 | 9/2004 | Merriman et al. |
| 2004/0172331 A1 | 9/2004 | Merriman et al. |
| 2004/0172332 A1 | 9/2004 | Merriman et al. |
| 2004/0172343 A1 | 9/2004 | Allibhoy et al. |
| 2004/0176170 A1 | 9/2004 | Eck et al. |
| 2004/0176995 A1 | 9/2004 | Fusz |
| 2004/0177001 A1 | 9/2004 | Salinas |
| 2004/0181808 A1 | 9/2004 | Schaefer et al. |
| 2004/0186766 A1 | 9/2004 | Fellenstein et al. |
| 2004/0186771 A1 | 9/2004 | Squires |
| 2004/0193488 A1 | 9/2004 | Khoo et al. |
| 2004/0194123 A1 | 9/2004 | Fredlund et al. |
| 2004/0194128 A1 | 9/2004 | McIntyre et al. |
| 2004/0201629 A1* | 10/2004 | Bates et al. .................. 345/808 |
| 2004/0204238 A1 | 10/2004 | Aoki |
| 2004/0204247 A1 | 10/2004 | Walker et al. |
| 2004/0205157 A1 | 10/2004 | Bibelnieks et al. |
| 2004/0205508 A1 | 10/2004 | Wecker et al. |
| 2004/0205807 A1 | 10/2004 | Wilcoxson et al. |
| 2004/0210472 A1 | 10/2004 | Lew et al. |
| 2004/0210489 A1 | 10/2004 | Jackson et al. |
| 2004/0210661 A1 | 10/2004 | Thompson |
| 2004/0210824 A1 | 10/2004 | Shoff et al. |
| 2004/0219977 A1 | 11/2004 | Ebisawa |
| 2004/0220850 A1 | 11/2004 | Ferrer et al. |
| 2004/0221018 A1 | 11/2004 | Ji |
| 2004/0224772 A1 | 11/2004 | Canessa et al. |
| 2004/0225562 A1 | 11/2004 | Turner |
| 2004/0225715 A1 | 11/2004 | Gottfried |
| 2004/0230593 A1 | 11/2004 | Rudin et al. |
| 2004/0230994 A1 | 11/2004 | Urdang et al. |
| 2004/0234932 A1 | 11/2004 | Hughes et al. |
| 2004/0236585 A1 | 11/2004 | Kohnke et al. |
| 2004/0243455 A1 | 12/2004 | Smith |
| 2004/0243466 A1 | 12/2004 | Trzybinski et al. |
| 2004/0243470 A1 | 12/2004 | Ozer et al. |
| 2004/0243623 A1 | 12/2004 | Ozer et al. |
| 2004/0248649 A1 | 12/2004 | Arai et al. |
| 2004/0249786 A1 | 12/2004 | Dabney et al. |
| 2004/0252051 A1 | 12/2004 | Johnson |
| 2004/0254831 A1 | 12/2004 | Dean |
| 2004/0254957 A1 | 12/2004 | Hyotyniemi et al. |
| 2004/0255148 A1 | 12/2004 | Monteiro et al. |
| 2004/0259553 A1 | 12/2004 | Delaney et al. |
| 2004/0260609 A1 | 12/2004 | Loeb et al. |
| 2004/0261125 A1 | 12/2004 | Ellis et al. |
| 2004/0266535 A1 | 12/2004 | Reeves |
| 2004/0266537 A1 | 12/2004 | Morris |
| 2004/0267611 A1 | 12/2004 | Hoerenz |
| 2005/0005242 A1 | 1/2005 | Hoyle |
| 2005/0015267 A1 | 1/2005 | Barringer et al. |
| 2005/0021387 A1 | 1/2005 | Gottfurcht |
| 2005/0021396 A1 | 1/2005 | Pearch et al. |
| 2005/0021397 A1 | 1/2005 | Cui et al. |
| 2005/0021403 A1 | 1/2005 | Ozer et al. |
| 2005/0021465 A1 | 1/2005 | Segerstrom |
| 2005/0021470 A1 | 1/2005 | Martin et al. |
| 2005/0021853 A1 | 1/2005 | Parekh et al. |
| 2005/0027587 A1 | 2/2005 | Latona et al. |
| 2005/0027595 A1 | 2/2005 | Ha et al. |
| 2005/0027699 A1 | 2/2005 | Awadallah et al. |
| 2005/0028188 A1 | 2/2005 | Latona et al. |
| 2005/0028195 A1 | 2/2005 | Feinleib et al. |
| 2005/0032577 A1 | 2/2005 | Blackburn et al. |
| 2005/0033700 A1 | 2/2005 | Vogler et al. |
| 2005/0038698 A1 | 2/2005 | Lukose et al. |
| 2005/0038702 A1 | 2/2005 | Merriman et al. |
| 2005/0050070 A1 | 3/2005 | Sheldon |
| 2005/0055725 A1 | 3/2005 | Stewart |
| 2005/0060264 A1 | 3/2005 | Schrock et al. |
| 2005/0075155 A1 | 4/2005 | Sitrick |
| 2005/0075172 A1 | 4/2005 | Coleman |
| 2005/0076051 A1 | 4/2005 | Carobus et al. |
| 2005/0091107 A1 | 4/2005 | Blum |
| 2005/0091108 A1 | 4/2005 | Frost |
| 2005/0091111 A1 | 4/2005 | Green et al. |
| 2005/0096975 A1* | 5/2005 | Moshe ............................ 705/14 |
| 2005/0096983 A1 | 5/2005 | Werkhoven |
| 2005/0097622 A1 | 5/2005 | Zigmond et al. |
| 2005/0101386 A1 | 5/2005 | Lavanchy et al. |
| 2005/0102177 A1 | 5/2005 | Takayama |
| 2005/0102202 A1 | 5/2005 | Linden et al. |
| 2005/0107158 A1 | 5/2005 | Kanisawa et al. |
| 2005/0108095 A1 | 5/2005 | Perlmutter |
| 2005/0113170 A1 | 5/2005 | McHugh |
| 2005/0114526 A1 | 5/2005 | Aoyama |
| 2005/0125286 A1 | 6/2005 | Crippen et al. |
| 2005/0130725 A1 | 6/2005 | Creamer et al. |
| 2005/0143174 A1 | 6/2005 | Goldman et al. |
| 2005/0144063 A1 | 6/2005 | Spector |
| 2005/0144073 A1 | 6/2005 | Morrisroe et al. |
| 2005/0149396 A1 | 7/2005 | Horowitz et al. |
| 2005/0153760 A1 | 7/2005 | Varley |
| 2005/0154640 A1 | 7/2005 | Kolluri et al. |
| 2005/0154717 A1 | 7/2005 | Watson et al. |
| 2005/0155056 A1 | 7/2005 | Knee et al. |
| 2005/0155083 A1 | 7/2005 | Oh et al. |
| 2005/0160442 A1 | 7/2005 | Kaplowitz |
| 2005/0164757 A1 | 7/2005 | Ebisawa |
| 2005/0165640 A1 | 7/2005 | Kotorov |
| 2005/0165644 A1 | 7/2005 | Beyda et al. |
| 2005/0171865 A1 | 8/2005 | Beardow |
| 2005/0177413 A1 | 8/2005 | Blumberg et al. |
| 2005/0177430 A1* | 8/2005 | Willis ............................ 705/14 |
| 2005/0177431 A1 | 8/2005 | Willis et al. |
| 2005/0177461 A1 | 8/2005 | Rosefelt et al. |
| 2005/0178940 A1 | 8/2005 | Granick |
| 2005/0179685 A1 | 8/2005 | Kake et al. |
| 2005/0182693 A1 | 8/2005 | Alivandi |
| 2005/0182737 A1 | 8/2005 | Brown |
| 2005/0185825 A1 | 8/2005 | Hoshino et al. |
| 2005/0192071 A1 | 9/2005 | Matsuno et al. |
| 2005/0192864 A1 | 9/2005 | Ganz |
| 2005/0193411 A1 | 9/2005 | Funston |
| 2005/0193425 A1 | 9/2005 | Sull et al. |
| 2005/0195157 A1 | 9/2005 | Kramer et al. |

(56) References Cited

U.S. PATENT DOCUMENTS

| | | |
|---|---|---|
| 2005/0202385 A1 | 9/2005 | Coward et al. |
| 2005/0203804 A1 | 9/2005 | Suzuki et al. |
| 2005/0203811 A1 | 9/2005 | David |
| 2005/0204381 A1 | 9/2005 | Ludvig et al. |
| 2005/0216346 A1 | 9/2005 | Kusumoto et al. |
| 2005/0216348 A1 | 9/2005 | Martin et al. |
| 2005/0216581 A1 | 9/2005 | Blumenau et al. |
| 2005/0222908 A1 | 10/2005 | Altberg et al. |
| 2005/0227749 A1 | 10/2005 | Bender et al. |
| 2005/0228797 A1 | 10/2005 | Koningstein et al. |
| 2005/0235030 A1 | 10/2005 | Lauckhart et al. |
| 2005/0235199 A1 | 10/2005 | Adams |
| 2005/0235310 A1 | 10/2005 | Bies |
| 2005/0235318 A1 | 10/2005 | Grauch et al. |
| 2005/0240476 A1 | 10/2005 | Bigott |
| 2005/0246736 A1 | 11/2005 | Beyda et al. |
| 2005/0247769 A1 | 11/2005 | Potter et al. |
| 2005/0251539 A1 | 11/2005 | Parekh et al. |
| 2005/0254366 A1 | 11/2005 | Amar |
| 2005/0256768 A1 | 11/2005 | Robinson |
| 2005/0261062 A1 | 11/2005 | Lewin et al. |
| 2005/0261962 A1 | 11/2005 | Chuah |
| 2005/0266906 A1 | 12/2005 | Stevens |
| 2005/0266907 A1 | 12/2005 | Weston et al. |
| 2005/0270537 A1 | 12/2005 | Mian et al. |
| 2005/0283395 A1 | 12/2005 | Lesandrini et al. |
| 2005/0283401 A1 | 12/2005 | Swix et al. |
| 2005/0288999 A1 | 12/2005 | Lerner et al. |
| 2006/0007312 A1 | 1/2006 | James |
| 2006/0031551 A1 | 2/2006 | Agresta et al. |
| 2006/0085816 A1 | 4/2006 | Funk et al. |
| 2006/0090186 A1 | 4/2006 | Santangelo et al. |
| 2006/0143650 A1 | 6/2006 | Tanikawa et al. |
| 2006/0150249 A1 | 7/2006 | Gassen et al. |
| 2006/0167747 A1 | 7/2006 | Goodman |
| 2006/0193471 A1 | 8/2006 | Stehle |
| 2006/0195859 A1 | 8/2006 | Konig et al. |
| 2006/0195860 A1 | 8/2006 | Eldering et al. |
| 2006/0212347 A1 | 9/2006 | Fang et al. |
| 2006/0230141 A1* | 10/2006 | Willis .......................... 709/224 |
| 2006/0242667 A1 | 10/2006 | Petersen et al. |
| 2006/0242703 A1 | 10/2006 | Abeni |
| 2006/0248209 A1 | 11/2006 | Chiu |
| 2006/0253330 A1 | 11/2006 | Maggio et al. |
| 2006/0294566 A1 | 12/2006 | Zlattner |
| 2007/0055980 A1 | 3/2007 | Megeid et al. |
| 2007/0066287 A1 | 3/2007 | Papulov |
| 2007/0078706 A1 | 4/2007 | van Datta |
| 2007/0078712 A1 | 4/2007 | Ott et al. |
| 2007/0078714 A1 | 4/2007 | Ott |
| 2007/0079326 A1 | 4/2007 | van Datta |
| 2007/0079331 A1 | 4/2007 | van Datta |
| 2007/0079335 A1 | 4/2007 | McDonough |
| 2007/0089151 A1 | 4/2007 | Moore et al. |
| 2007/0094081 A1 | 4/2007 | Yruski |
| 2007/0094082 A1 | 4/2007 | Yruski |
| 2007/0094083 A1 | 4/2007 | Yruski |
| 2007/0094363 A1 | 4/2007 | Yruski |
| 2007/0101360 A1 | 5/2007 | Gutta et al. |
| 2007/0118425 A1 | 5/2007 | Yruski |
| 2007/0130012 A1 | 6/2007 | Yruski |
| 2007/0146812 A1 | 6/2007 | Lawton |
| 2007/0150919 A1 | 6/2007 | Morishita |
| 2007/0162945 A1 | 7/2007 | Mills |
| 2007/0174471 A1 | 7/2007 | Van Rossum |
| 2007/0294740 A1 | 12/2007 | Drake et al. |
| 2007/0299935 A1 | 12/2007 | Plastina et al. |
| 2008/0046948 A1 | 2/2008 | Verosub |
| 2008/0097872 A1* | 4/2008 | Peckover .................. 705/26 |
| 2008/0104106 A1 | 5/2008 | Rosenberg et al. |
| 2008/0109844 A1 | 5/2008 | Baldeschwieler et al. |
| 2008/0127244 A1 | 5/2008 | Zhang |
| 2008/0140239 A1 | 6/2008 | Rosenberg et al. |
| 2008/0140717 A1 | 6/2008 | Rosenberg et al. |
| 2008/0141372 A1 | 6/2008 | Massey et al. |
| 2008/0207137 A1 | 8/2008 | Maharajh et al. |
| 2009/0083788 A1 | 3/2009 | Russell |
| 2009/0183081 A1 | 7/2009 | Rodriguez |
| 2009/0204481 A1 | 8/2009 | Navar |
| 2010/0022310 A1 | 1/2010 | van Datta |
| 2010/0030640 A1 | 2/2010 | van Datta |
| 2010/0043022 A1 | 2/2010 | Kaftan |
| 2010/0169910 A1 | 7/2010 | Collins et al. |
| 2010/0269138 A1 | 10/2010 | Krikorian et al. |
| 2011/0004669 A1 | 1/2011 | Navar |
| 2011/0010545 A1 | 1/2011 | Kill et al. |
| 2011/0015975 A1 | 1/2011 | Yruski et al. |
| 2011/0029383 A1 | 2/2011 | Engel et al. |
| 2011/0125582 A1 | 5/2011 | van Datta |
| 2011/0307339 A1 | 12/2011 | Russell |
| 2013/0232000 A1 | 9/2013 | van Datta |
| 2013/0232001 A1 | 9/2013 | van Datta |

FOREIGN PATENT DOCUMENTS

| | | |
|---|---|---|
| EP | 0405 776 A2 | 1/1991 |
| EP | 0 620 688 A2 | 10/1994 |
| EP | 0 625 760 | 11/1994 |
| EP | 0 743 595 | 10/1996 |
| EP | 0 905 928 | 3/1999 |
| GB | 2 141 907 A | 1/1985 |
| GB | 2 194 369 A | 3/1988 |
| JP | 12-20925 | 9/1989 |
| JP | 6335569 | 12/1994 |
| JP | 8117445 | 5/1996 |
| JP | 8173634 | 7/1996 |
| JP | 82-80934 | 10/1996 |
| JP | 2001111921 | 4/2001 |
| JP | 2002-259433 | 9/2002 |
| JP | 2002-358455 | 12/2002 |
| WO | WO 93/14462 A1 | 7/1993 |
| WO | WO 93/19427 A1 | 9/1993 |
| WO | WO 93/22017 A1 | 11/1993 |
| WO | WO 93/23125 | 11/1993 |
| WO | WO 95/12442 A1 | 5/1995 |
| WO | WO 95/12853 | 5/1995 |
| WO | WO9959097 A1 | 11/1999 |
| WO | WO 03/032127 A2 | 4/2003 |
| WO | WO 2004/100010 | 11/2004 |
| WO | WO 2005/086969 A2 | 9/2005 |
| WO | WO 2007/041022 | 4/2007 |
| WO | WO 2007/041028 | 4/2007 |
| WO | WO 2007/130681 | 11/2007 |

OTHER PUBLICATIONS

Business Wire, "RTIME Announces First 100-Person Twitch Game for Internet; "RTIME Rocks!" Demonstrates the Power of the RTIME Interactive Networking Engine to Support Large Scale, High Performance, Internet Game Play," Apr. 14, 1997.

Nielsen Media Research, "What TV Ratings Really Mean," Jun. 2005.

"Statement in Accordance with the Notice from the European Patent Office dated Oct. 1, 2007 Concerning Business Methods" Nov. 1, 2007, XP002456252.

Extended European Search Report for EP 07776856.2 dated Jun. 9, 2011.

JP Notification Reasons for Refusal for JP Application No. 2009-509786 dated Jul. 28, 2011.

U.S. Appl. No. 12/190,323 Final Office Action mailed Nov. 14, 2011.
U.S. Appl. No. 12/370,531 Final Office Action mailed Nov. 16, 2011.
U.S. Appl. No. 12/571,225 Office Action mailed Feb. 2, 2012.

Andreaux. J.-P.; Copy Protection system for digital home networks; Mar. 2004; IEEE, vol. 21, Issue: 2; pp. 100-108.

Cohen, Josh, "A General Overview of Two New Technologies for Playing Protected Content on Portable or Networked Devices," Microsoft Windows Media, Jun. 2004, 1-8.

Courtois N. et al: An Algebraic Masking Method to Protect AES Against Power Attacks, 'Online! XP002344150 Retrieved from the Internet: URL:eprint.iacr.org/2005/204.pdf> 'retrieved on Sep. 8, 2005.

(56) References Cited

OTHER PUBLICATIONS

Microsoft Corporation, "A Technical Overview of Windows Media DRM 10 for Devices," Microsoft Windows Media, Sep. 2004, 1-16.
Microsoft Corporation, "Architecture of Windows Media Rights Manager," www.microsoft.com/windows/windowsmedia/howto/articles/drmarchitecture.aspc, May 2004.
Recording Industry Association of America, "Frequently Asked Questions—Webcasting," www.riaa.com/issues/licensing/webcasting_faq.asp. (acc. 2004).
U.S. Copyright Office, "The Digital Millennium Copyright Act of 1998," Oct. 1998, 1-18.
PCT/US06/037018, International Search Report and Written Opinion mailed Aug. 7, 2007.
PCT/US06/036958, International Search Report and Written Opinion mailed Apr. 27, 2007.
PCT/US07/11059, International Search Report and Written Opinion mailed May 30, 2008.
EP 06815173.7, Extended European Search Report mailed Oct. 5, 2011.
JP 2009-509786, Decision of Refusal mailed Oct. 30, 2012.
JP 2009-509786, Decision of Refusal mailed Jul. 28, 2011.
CN 200780016268.2, First Office Action mailed Jan. 4, 2012.
U.S. Appl. No. 11/241,229 Final Office Action mailed Apr. 23, 2010.
U.S. Appl. No. 11/241,229 Office Action mailed Nov. 19, 2009.
U.S. Appl. No. 12/571,204 Office Action mailed Feb. 28, 2012.
U.S. Appl. No. 11/240,655 Office Action mailed Aug. 5, 2013.
U.S. Appl. No. 11/240,655 Final Office Action mailed Jan. 27, 2010.
U.S. Appl. No. 11/240,655 Office Action mailed Apr. 16, 2009.
U.S. Appl. No. 12/190,323 Final Office Action mailed Feb. 25, 2013.
U.S. Appl. No. 12/190,323 Office Action mailed May 7, 2012.
U.S. Appl. No. 12/190,323 Office Action mailed Jun. 8, 2011.
U.S. Appl. No. 13/191,398 Final Office Action mailed Jun. 7, 2013.
U.S. Appl. No. 13/191,398 Office Action mailed Mar. 22, 2012.
U.S. Appl. No. 13/013,789 Final Office Action mailed Feb. 27, 2013.
U.S. Appl. No. 13/013,789 Office Action mailed Oct. 9, 2012.
U.S. Appl. No. 11/452,848 Final Office Action mailed Feb. 15, 2011.
U.S. Appl. No. 11/452,848 Office Action mailed Sep. 15, 2010.
U.S. Appl. No. 11/452,848 Final Office Action mailed Apr. 21, 2010.
U.S. Appl. No. 11/452,848 Office Action mailed Oct. 20, 2009.
U.S. Appl. No. 11/452,848 Final Office Action mailed Jul. 9, 2009.
U.S. Appl. No. 11/452,848 Office Action mailed Jan. 27, 2009.
U.S. Appl. No. 11/586,990 Final Office Action mailed Apr. 10, 2013.
U.S. Appl. No. 11/586,990 Office Action mailed Nov. 23, 2012.
U.S. Appl. No. 11/586,990 Final Office Action mailed Feb. 14, 2011.
U.S. Appl. No. 11/586,990 Office Action mailed Sep. 15, 2010.
U.S. Appl. No. 11/588,036 Final Office Action mailed Oct. 4, 2012.
U.S. Appl. No. 11/588,036 Office Action mailed Apr. 27, 2012.
U.S. Appl. No. 11/588,036 Final Office Action mailed Feb. 17, 2011.
U.S. Appl. No. 11/588,036 Office Action mailed Sep. 14, 2010.
U.S. Appl. No. 11/586,958 Office Action mailed Mar. 18, 2011.
U.S. Appl. No. 11/586,958 Office Action mailed Sep. 1, 2010.
U.S. Appl. No. 11/586,958 Office Action mailed Dec/ 11, 2009.
U.S. Appl. No. 11/586,989 Final Office Action mailed Dec. 9, 2010.
U.S. Appl. No. 11/586,989 Office Action mailed May 11, 2010.
U.S. Appl. No. 11/586,989 Office Action mailed Mar. 30, 2009.
U.S. Appl. No. 11/586,959 Final Office Action mailed Aug. 30, 2013.
U.S. Appl. No. 11/586,959 Office Action mailed May 8, 2013.
U.S. Appl. No. 11/586,959 Final Office Action mailed Oct. 5, 2012.
U.S. Appl. No. 11/586,959 Office Action mailed Apr. 27, 2012.
U.S. Appl. No. 11/586,959 Final Office Action mailed Feb. 14, 2011.
U.S. Appl. No. 11/586,959 Office Action mailed Oct. 1, 2010.
U.S. Appl. No. 12/370,531 Office Action mailed Aug. 1, 2013.
U.S. Appl. No. 12/370,531 Final Office Action mailed Aug. 3, 2011.
U.S. Appl. No. 12/370,531 Final Office Action mailed Aug. 1, 2011.
U.S. Appl. No. 12/370,531 Office Action mailed Feb. 2, 2011.
U.S. Appl. No. 11/588,236 Office Action mailed Sep. 9, 2009.
U.S. Appl. No. 11/588,236 Office Action mailed Mar. 5, 2009.
U.S. Appl. No. 12/703,188 Final Office Action mailed Oct. 12, 2012.
U.S. Appl. No. 12/703,188 Office Action mailed Apr. 6, 2012.
U.S. Appl. No. 10/924,009 Supplemental Final Office Action mailed Feb. 4, 2009.
U.S. Appl. No. 10/924,009 Final Office Action mailed Dec. 5, 2008.
U.S. Appl. No. 10/924,009 Office Action mailed Jun. 30, 2008.
U.S. Appl. No. 12/717,108 Final Office Action mailed Jan. 13, 2012.
U.S. Appl. No. 12/717,108 Final Office Action mailed Ju. 20, 2011.
U.S. Appl. No. 12/717,108 Office Action mailed Feb. 9, 2011.
U.S. Appl. No. 12/782,678 Final Office Action mailed Jul. 31, 2013.
U.S. Appl. No. 12/782,678 Office Action mailed Jan. 7, 2013.
U.S. Appl. No. 12/782,678 Office Action mailed Oct. 4, 2012.

* cited by examiner

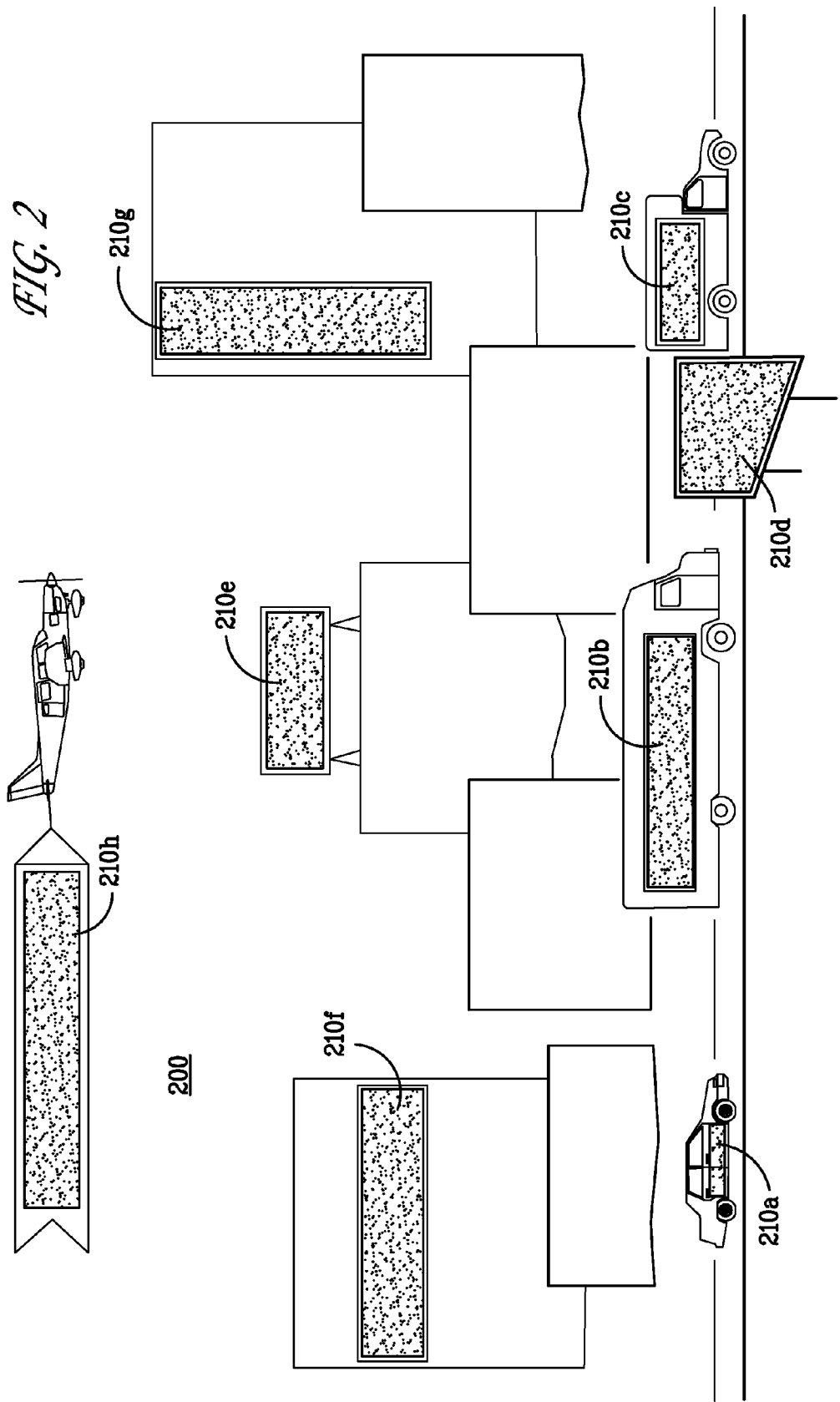

POPULATION OF AN ADVERTISEMENT REFERENCE LIST

CROSS-REFERENCE TO RELATED APPLICATIONS

This application claims the priority benefit of U.S. provisional patent application No. 60/798,240 filed May 5, 2006 and entitled "Population of an Advertisement Reference List"; this application is also a continuation-in-part and claims the priority benefit of U.S. patent application Ser. No. 11/241,229 filed Sep. 30, 2005 and entitled "Advertising Impression Determination," the disclosure of which is incorporated herein by reference.

This application is related to U.S. patent application Ser. No. 09/780,995 for an "In-Contents Advertising Method, In-Contents Advertising Server, and Program-Transferring Medium for Realizing In-Contents Advertising," the disclosure of which is incorporated herein by reference.

BACKGROUND OF THE INVENTION

1. Field of the Invention

This invention relates generally to advertisements in a digital medium. More specifically, this invention relates to generating lists of products, services and/or advertisers that may be of interest to a particular consumer, those products or services or an advertisement related thereto having been encountered in a digital medium, such as an interactive video game.

2. Description of the Related Art

At one time, advertisements were limited to handbills and word-of-mouth. As new mediums for communication developed, so did opportunities and means for advertising. For example, with the advent of newspapers and magazines, advertisements soon began to fill the pages alongside the daily or weekly news.

Such advertising generally proved to be a benefit to all parties involved. Advertisers were able to tout their latest products or services (or those of their clientele); newspapers and magazines were able to offset the costs of printing through the sale of advertising space; and consumers were able to learn of new products of interest through their interaction with these various forms of media. This beneficial relationship amongst the advertiser, media, and consumer held true with regard to the arrival of radio and television.

Advertisers and media outlets are now, however, finding themselves challenged by the rise of digital media, especially with regard to video games and portable digital media devices. As the advertising power of older mediums decreases due to the rise of video games and portable digital media as forms of entertainment, advertising buys for product and service offerings are generally seen by less people as a whole and, demographically, less of the power-buying public. As such, there has become an increased effort to expand advertising to digital media.

Despite the ability to introduce advertising content into, for example, a video game environment, the user may often be unable to view the advertisement or to process and comprehend the information conveyed by that advertisement. For example, in a racing game, a user might pass a billboard advertising a particular product or service. Due to the speed of the user's vehicle in the video game environment and the need of the user to focus on maintaining control of their vehicle and competing with other players, the user may be unable to observe all the aspects of the advertisement, especially if the advertisement conveys some degree of detail or 'fine print.'

Similarly, in a role-playing game, a user might guide a game character through an urban environment while fighting an enemy character. As a result of the user attempting to keep their game character alive, it may be unlikely for the user to have the opportunity to pay close attention to any advertising that might appear on billboards or in other locales in the game environment.

Notwithstanding the possible inability of the user to observe these advertisements due to other priorities (e.g., in game competition or watching a movie on DVD), many users may have a genuine interest in a product or service being advertised. Similarly, advertisers may have spent considerable sums of money for the placement of static or dynamic advertisement in a particular game environment. Accordingly, there is a need for users to be able to observe advertisements and/or products and services related to those advertisements that appear in a digital environment at a time more conducive to observation whereby user attention to advertisements does not interrupt or overtly hinder the core video game or digital media experience.

SUMMARY OF THE INVENTION

An embodiment of the present invention provides a method for generating an advertisement list based on user impressions. Through the method, an advertisement may be displayed in a digital environment. A subsequent confirmation may occur as to whether an impression of that advertisement has occurred. Based on that impression, advertisement information may be added to a reference list. A user may then peruse the reference list at their own convenience and outside of in-game or other interactions (e.g., watching a movie). The reference list may provide the user with the means to link to a more detailed source of information about the product and/or an opportunity to purchase the product.

An additional embodiment of the invention provides a method for generating an advertisement list based on user interactions with an advertisement, product or service. Through this method, an advertisement may be displayed in a digital environment. A subsequent confirmation may be made as to whether a user has somehow interacted with that advertisement, product, or service through direct or indirect activity. Based on that interaction, information may be added to a reference list. A user may then peruse the reference list at their own convenience and outside of in-game or other interactions (e.g., watching a movie). The reference list may provide the user with the means to link to a more detailed source of information about the product and/or an opportunity to purchase the product.

An exemplary system for implementing the aforementioned impression-based and interaction-based reference list population methods is also disclosed as is a software-medium for implementing the same.

BRIEF DESCRIPTION OF THE DRAWINGS

FIG. 2 illustrates an exemplary digital video game environment with a variety of 'tagged' objects for the insertion of advertising content.

DETAILED DESCRIPTION

Figure 1B:
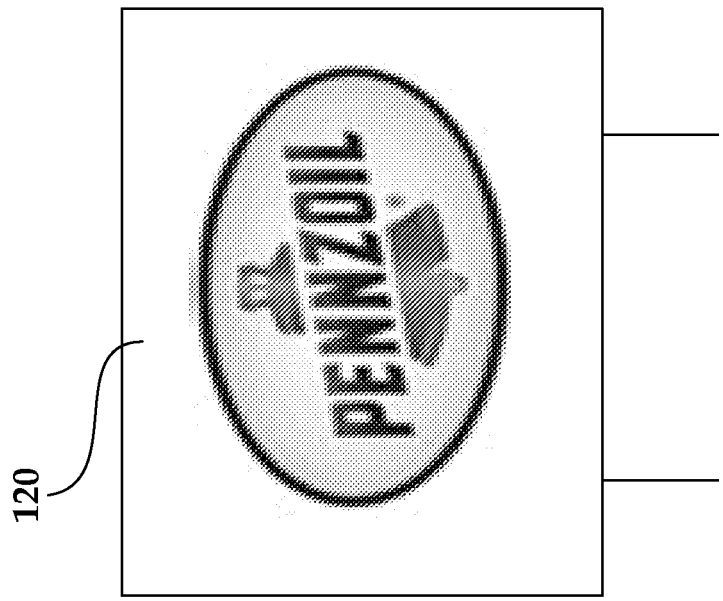
FIG. 1B illustrates a 'tagged' object wherein an advertisement has been 'inserted' into the 'tagged' area.
Figure 1A:
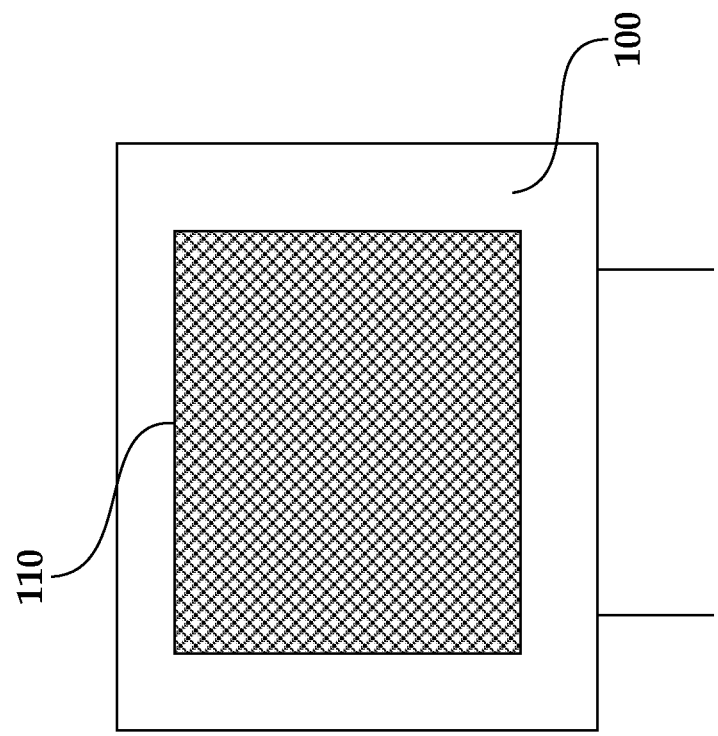
FIG. 1A illustrates a 'tagged' object in a digital environment such as a video game.

Certain objects in a digital medium such as a video game may be 'tagged,' these 'tagged' areas being subject to the possible insertion or placement of advertising content. For example, and as shown in FIG. 1A, the face of a billboard 100 may be 'tagged' (110) to indicate that an advertisement may be embedded in that location. In this way, an advertising system like that disclosed in U.S. patent application Ser. Nos. 09/780,995 and 11/241,229 may, via an advertising client embodied in video game software or system hardware, identify various tagged areas 110. The system may then provide advertising content that may be imposed through texturing or other graphic rendering techniques that make it appear as if the advertisement was designed specifically for the billboard as shown FIG. 1B (120). The disclosure of the aforementioned '229 application is incorporated herein by reference. Such dynamic advertising content may be pushed or pulled into the video game or other digital environment via, for example, an end-user client and/or advertising server.

Advertising content may also be loaded into digital media during development and subsequently 'unlocked' by a game player after purchase of the media. For example, a user may input a special code or obtain an 'Easter egg' in a game whereby specific ads embedded in the game are made available for association with one or more tagged advertising assets. Similar codes or 'Easter eggs' may be used to unlock special content delivered over a network, such as advertisements hosted by an advertisement server.

Various methodologies for 'inserting' content into a 'tagged' asset are known in the art. For example, U.S. Pat. No. 5,946,664 for an "Apparatus and Method for Executing a Game Program Having Advertisements Therein" discloses receiving, at predetermined times, advertising data that relates to at least one advertisement in a video game. The advertising data may then be displayed in particular locales in the game environment in accordance with the particular game program. U.S. Pat. No. 6,539,544 for a "Game Machine System, Broadcasting System, Data Distribution System, and Method, Program Executing Apparatus and Method" discloses a system configured to distribute digital data in response to software start enable signals and identification signals. These signals may correspond to commercial advertisements for substitution or insertion into a portion of the data at the receiver side system. The disclosure of both U.S. Pat. Nos. 5,946,664 and 6,539,544 are incorporated herein by reference. Other alternative, equivalent, or derived methodologies for introducing advertising content into a 'tagged' area may be used in the practice of the presently disclosed invention.

FIG. 2 illustrates an exemplary digital video game environment 200—in this case a cityscape—with a variety of advertisements as may be implemented in an embodiment of the present invention. The elements identified in FIG. 2 are exemplary and may include various alternatives, equivalents, or derivations thereof. The cityscape game environment 200 may reflect any number of objects and structures as may be found in a city environment: for example, a number of buildings in addition to vehicles that travel throughout the general landscape (e.g., hills, mountains, etc.) via a series of roadways. Certain objects may also appear in the video game environment 200 surrounding the city, such as airplanes and the like.

While a cityscape is depicted in FIG. 2, any number of different video game environments may be utilized within the scope of the present invention. For example, the video game environment may be a race-track, which might reflect the racing surface and grandstands filled with spectators. 'Pit-row' might run along side a particular portion of the race-track. Alternatively, the video game environment 200 may be a modern or medieval battlefield in addition to any number of natural environments (e.g., underwater, outer space, open fields, forests, mountains, etc.). The present invention may be implemented in any video game environment 200. Regardless of the particular video game environment 200, game designers and engineers may attempt to make the environment as realistic as possible. This realism may be achieved by including objects and structures that lend to realism of that particular environment.

In the case of the cityscape of FIG. 2, part of that realism may be attributed to various types of signage, specifically advertisements, trade names, trademarks or corporate logos (collectively referred to as advertisements) that indicate the source or quality of certain goods and/or services. Various structures in the video game environment 200 of FIG. 2 exhibit numerous types of exemplary signage and advertisements 210.

For example, advertisement 210a is an advertisement as may be found on the side of a taxi-cab. The advertisement may be the taxi-cab company name and phone number or for a particular good or service in the region serviced by the taxi-cab (e.g., a night club). Similarly, advertisement 210b is an advertisement as may be found on the side of a bus, which may be for the local newspaper, a local radio show, or an upcoming movie. Likewise, advertisement 210c found on the side of, for example, an industrial vehicle may be for a particular shipping company (e.g., a moving company) or for the name of the company whose cargo is being shipped (e.g., a furniture company).

Advertisements may also be on billboards as in the case of advertisement 210d and advertisement 210e. Such billboards may be alongside a road (like advertisement 210d) or may be atop a building (like advertisement 210e). Any variety of goods or services may be found on such billboards as is the case in the real world. Signage and related advertisements and indicia of sponsorship or ownership may also be found on the face of a building (like advertisement 210f), which could reflect the name of the company occupying the building or may also be a poster of some sort applied to the face of a building that may be permanent or temporary (like advertisement 210g).

Advertisements may be found in a variety of other mediums in the video game environment 200. Examples of such mediums include skywriting, banners that follow behind an airplane (like advertisement 210f), or on the actual body of the airplane or a vehicle (e.g., painted on the body or frosted on the glass versus an affixed sign or placard). Advertisements may also be seen on any variety of posters and signs as may be found at bus stops or on televisions in an electronics store. Similarly, advertisements may be seen on handbills, flyers or other printed media in the video game environment 200. Additionally, certain advertising effects may be achieved through audio advertising over the radio or a loudspeaker or the spoken word of other characters in the video game environment 200 as is further discussed below.

Advertising 'tags' (as referenced in FIG. 1A) are not limited to identifying the space in a game environment 200 where advertisement content may be 'inserted.' Advertisement 'tags' may also reflect information such as size limitations, rendering parameters (e.g., coloring and shading), pointers to variables that track state and impression data, functions and programs associated with the advertisement, hyperlinks, mini-games associated with the advertisement, user-profile filters and, in some embodiments, even advertising relevance. For example, various parties may impose and apply rules and metadata related to the 'tagging' of assets as well as the advertising content that is ultimately inserted into these assets. As a result of 'tagging' various advertisement areas, not only may relevant advertising content (e.g., targeted advertising based on a user profile) be delivered to a user but the generation of an advertisement reference list may take place as is further described below.

Advertising 'tags' are not limited to non-moving 'print-like' advertisements (e.g., a billboard). Advertising 'tags' can also be associated with other formats such as audio and video. For example, a television in a video game may be 'tagged.' This television 'tag' may reflect that the user tuning the television to a particular channel may cause a full motion video advertisement to be streamed. Various other advertisements may be streamed or rendered on additional channels subject to the whim of the game designer and the extent of 'tagging' of assets for advertisement introduction. Similar attributes may be reserved for providing real-time programming and the like (e.g., short films, movie previews and so forth).

Similarly, audio may be 'tagged' for advertising purposes. For example, if a user plays a video game with a radio (e.g., in an automobile), the game designer may create different stations whereby actual music from actual musical artists may be played. That music may be interspersed with various advertisements as one might hear over the radio in the real-world. Similarly, the actual music a user listens to may be a dynamic play list as in the case of a real-world radio station instead of a one-time, static soundtrack. In that way, the user may play the game today or five years from now and be able to listen to not only relevant advertisement but relevant music that is current and popular as of the day the user plays the game.

Figure 3:
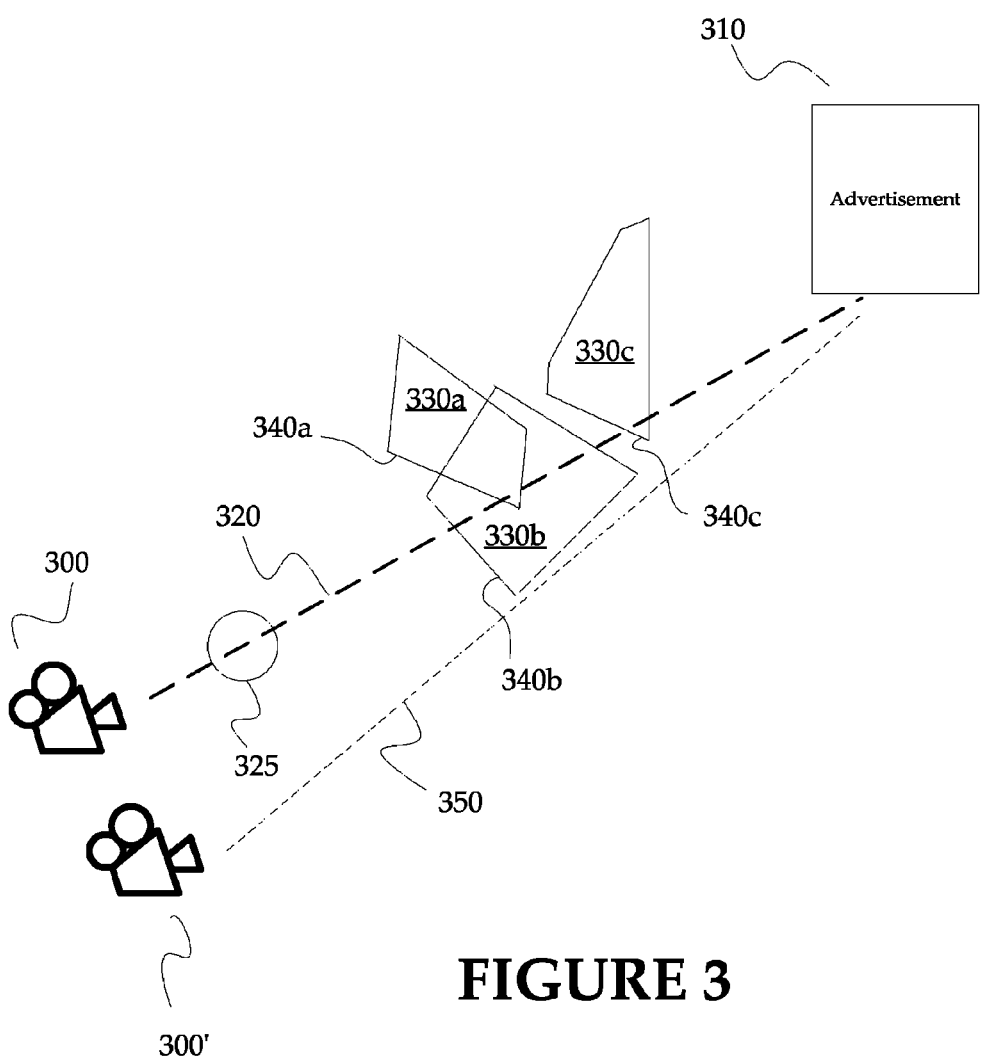
FIG. 3 illustrates a means for determining whether an advertisement impression has been generated for the purpose of populating an advertisement reference list using a line-of-sight determination.

Determining whether an advertisement impression of a 'tagged' asset has occurred for the purpose of populating an advertisement reference list may be accomplished using a line-of-sight determination as illustrated in FIG. 3. The elements identified in FIG. 3 are exemplary and may include various alternatives, equivalents, or derivations thereof. In FIG. 3, an obstructed line-of-sight 320 is shown between game character 300 and advertisement 310. FIG. 3 also shows an unobstructed line-of-sight 350 between game character 300' at a different position relative to advertisement 310. The determination of obstruction may be established by testing line-of-sight 320 (or 350) between game character 300 (300') and advertisement 310 that passes through a center of an obstruction probe 325.

In some embodiments, obstruction probe 325 may be a spherical object with a predetermined radius r. Obstruction probe 325 may travel along the line of sight 320 (or 350) between game character 300 (300') and advertisement 310. If obstruction probe 325 does not collide with any obstacles, then the line-of-sight between the game character and advertisement 310 may be deemed as being unobstructed. If game character 300 is located in an optional impression area (as described herein) and oriented toward the advertisement 310, an impression of the advertisement 310 may be confirmed and advertisement reference information may be added to an advertisement reference list. Unobstructed line-of-sight 350 illustrates the absence of object obstruction between game character 300' and advertisement 310, which may allow for an advertising impression and subsequent population of an advertisement reference.

Alternatively, line-of-sight 320 may be obstructed as a result of one or more objects 330a . . . 330c, preventing an advertising impression and the subsequent addition of advertisement information to an advertisement reference list. If the obstruction probe 325, while traveling along (obstructed) line-of-sight 320 intersects one or more polygonal sides 340a . . . 340c of one or more objects 330a . . . 330c, where each of one or more objects 330a . . . 330c is typically constructed from multiple polygonal sides 340a . . . 340c, then an unobstructed view of the advertisement 310 relative the game character 300 may not be possible and no advertising impression may be generated notwithstanding the presence of the game character 300 in an optional impression area.

An impression area may be defined, in part, by a combination of a first angle $\theta i$ and a second angle $\theta r$ relative to a surface vector of the advertisement. The first angle $\theta i$ is the angle measured from a ray to the surface normal ($\theta$) wherein normal incidence is an angle of zero. The second angle $\theta r$ is the angle measured from a ray to the surface normal. The second angle $\theta r$, at least with regard to isotropic surface, may be identical to the first angle $\theta i$ (i.e., $\theta i = \theta r$). For example, a first angle $\theta i$ and second angle $\theta r$ each may have an angle of about 30° relative the surface normal. Impression area or obstruction probe information may be defined by an advertiser (e.g., through an advertisement 'tag') or set by a particular manufacturer of a video game or other digital environment wherein an advertisement might be viewed. Various other impression area determination methodologies are disclosed in U.S. patent application Ser. No. 11/241,229.

In some embodiments of the present invention, partial viewing of and exposure to an advertisement may be sufficient to establish an advertising impression for the purpose of populating an advertisement reference list. For example, certain trademarks or logos may have established a certain degree of notoriety within the purchasing public. For these famous or easily recognizable trademarks or logos, viewing even a portion of the trademark or logo may be sufficient to establish an advertising impression.

Similar 'partial viewing impressions' may be acceptable with regard to slogans, celebrities, famous spokespersons, and so forth. In these instances, even though the obstruction probe 325 may intersect with an object, if the intersection involves only a small percentage of the probe 325, then a partial impression may be generated that allows for the transfer of information to an advertisement reference list. If the object obscures the advertisement in its entirety—that is, 100% of the probe 325 intersects with the object-then no impression may be generated and the advertisement reference list may not be populated with any new information.

The radius r of the obstruction probe 325 may be reduced whereby a collision with a polygonal sides 340a . . . 340c of one or more objects 330a . . . 330c may be avoided thus allowing for an unobstructed line-of-sight and, subject to presence in an optional impression area, establishing an advertising impression and subsequent population of an advertisement reference list. In that regard, the radius r of obstruction probe 325 may be relative to an advertisement to be viewed. Information relative the setting of radius r may, as noted above, be part of advertising data pushed to a video game environment by an advertising server in the context of an advertisement tag.

Population of an advertisement reference list may also be subject to the measurement of a user's exposure to an advertisement via an impression counter like that described in U.S. patent application Ser. No. 11/241,229. Through the use of an impression counter, an advertiser may determine whether an impression has been made if the existence of an impression is tied to the duration of presence in the advertisement impression area (e.g., the time of exposure to the advertisement). An advertisement impression as may be tied to population of an advertisement reference list may be defined as unobstructed exposure to an advertisement for a certain period of time. A ratio as to obstruction percentage versus exposure time be also be used. For example and with regard to generating an impression, the obstruction of a portion of an advertisement may be overcome through greater exposure to the remainder of the advertisement that is not obstructed.

The various advertisement impression determinations disclosed herein may be implemented utilizing software downloads or through software installed on physical media (e.g. a software client on an optical disk) or may be pre-installed in a gaming device. Various software modules that interact with the advertisement impression determination software (e.g., receiving advertisement impression information for reporting to an advertiser) may be further located in various other aspects of an advertisement system or a single hardware device interaction with a large system (e.g., over a network).

Advertisements, especially those ads that are audible in nature or are full motion video, may be subject to real-time limitations. For example, a user in a video game may be changing the channels of a television in the video game environment. If the user only watches two seconds of the advertisement, an impression may or may not be generated and the reference list may or may not populated as is appropriate. Such limitations in the case of real-time advertising may be subject not only to an impression area but also an impression time and even an impression time relative particular portions of the advertisement.

For example, an advertisement may be thirty-seconds in length but the first five-seconds may not indicate the nature of the product and the last five-seconds may concern legal boilerplate required by the particular advertisement. If an impression time is identified as five-seconds, watching the first or last five-seconds of this particular advertisement would technically constitute an impression notwithstanding the fact that the user knows nothing more about the product after those five-seconds than they did prior. In these cases, limitations as to impressions of particular portions of an advertisement may be implemented. For example, for an advertiser to consider there to have been an impression, the user may be required to not only view five-seconds of the advertisement but those five-seconds must be within the middle 20-seconds of the 30-second advertisement (i.e., the substantive portion of the advertisement).

Video or audio ads may also be subject to start-stop loops. That is, the advertisement may start when the user accesses the advertisement (e.g., tunes to a radio station playing the advertisement) and may then stop when the user leaves the advertisement (e.g., changes the radio to another station). If the user then changes back to the original station with the advertisement, the advertisement may commence where it left off as if no time has passed. Such a methodology better ensures an impression of the advertisement on a user but may do so at the risk compromising reality (i.e., real-time passage of time is not in effect). Similar looping may be applied to video wherein the tagged object may track the state of the advertisement impression. Video related objects may comprise an index of the location in a video file to start the next sequence for the video loop.

Other advertisements may be rendered or emitted in true real-time. For example, a television advertisement in a video game may be two-minutes in length. The user may change the channel in the video game after thirty-seconds of viewing the advertisement but then come back to the same channel thirty-seconds later. The advertisement may now be at the 60-second point and not the 30-second point as may be the case in a start-stop embodiment.

While real-time advertisements may be more realistic, ensuring an impression may become more difficult relative the portion of the advertisement the user viewed as has been previously noted. Certain impressions, especially in the real-time video and audio sense, may be subject to ongoing impression limitations. For example, an impression may constitute viewing 30-seconds of a one minute advertisement. The user may, at one point in the game, view a first 10-second portion of the advertisement, view a second 10-second portion at a different point in the game and view yet another 10-second portion at another point in the game. In this instance, the user—albeit piecemeal—may have viewed enough of the advertisement over the course of time to constitute an impression. Advertising client software or advertisement reference module 655 (FIG. 6) may track this progress.

Other advertisements may limit an impression opportunity to consecutive time or such piecemeal viewing/listening but within an overall time frame. For example, viewing the advertisement in 10-second snippets may suffice as an advertisement but their viewings must occur within 15 minutes of one another. Other advertisements may require the thirty-seconds to occur consecutively or an impression may not be established.

In another embodiment of the present invention, advertisement reference population may occur through interaction with an advertisement, product, or service. For example, a user may cause their game character to listen to a particular song on the radio or watch a particular movie or television program. Similarly, the user may cause their character to drive a particular automobile or to drink a particular beverage. The user may further cause their character to interact with certain items in the environment such as articles of clothing, fashion accessories, or any other good or service.

Interactions may include an information exchange, a communication, observation, detection of sound, and direct or indirect physical contact contact. For example, an interaction may constitute an exchange of information via a conversation. An interaction may also be represented by the receipt of information via observations. Alternatively, a character may interact directly with an object. For example, a game character may pick up a soft drink sold by a particular soft drink manufacturer. In a further embodiment, a game character may hear a communication, for example, from a television or a radio broadcast or between other game characters. In yet another embodiment, a game character may indirectly come into contact with a product; for example by discharging a weapon at a vending machine or a billboard. The above described game interactions are exemplary; the scope of the present invention covers all types of interactions with an advertisement, product, or service. As such, these interactions include a broad universe of alternatives, equivalents, and derivations thereof.

Certain items in an environment may also be sponsored items. For example, a particular event in a game (e.g., a mini-game or a contest) may be sponsored by a real-world company. Interactions or impressions associated with a sponsored event or item would also cause the generation of advertisement identifiers that would populate a reference list as is discussed in FIG. 4 below.

Figure 4:
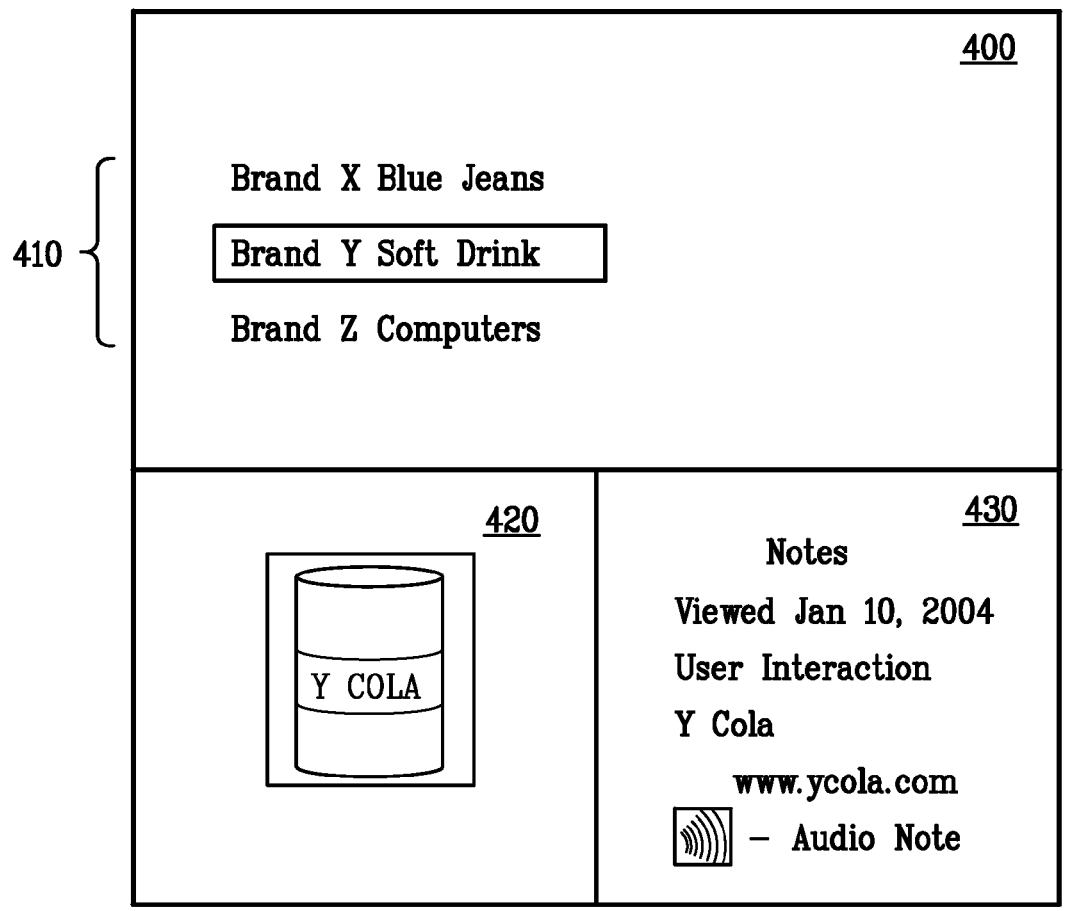
FIG. 4 illustrates an advertisement reference list generated as the result of advertising impressions or advertisement interactions.

FIG. 4 illustrates an advertisement reference list 400 generated as the result of advertising impressions or advertisement interactions. The elements identified in FIG. 4 are exemplary and may include various alternatives, equivalents, or derivations thereof. Items in the list (i.e., advertisement identifiers 410) may be represented in any number of different formats. For example, items may be listed alphabetically or may be subject to certain priorities as established through various advertisers 'buying in' to an advertisement network. One advertiser may pay a premium fee for their product name to be listed prior to other product names. Listings may also be subject to the order in which a user interacted with an advertisement or when an impression was generated. Listings may also be categorized; for example, by product sector or service sector. Sub-categories may also be generated: food, movies, music, etc. Any number of categorization and arrangement schemes may be implemented in reference list 400.

Advertisement identifiers 410 may also be accompanied by other ancillary advertisement data 420. For example, the ancillary advertisement data may comprise a small 'thumbnail' image of a particular product (e.g., a movie poster or book cover); a sound file (e.g., a user testimonial); a Java™ applet (e.g., to provide constantly updated advertisement data) and the like.

Advertisement identifiers 410 may also be associated with a notes field 430. Through notes filed 430, certain information related to the advertisement identifier 410 and the advertisement to which it is associated and contextual information about that advertisement may be provided. For example, the notes field 430 may identify when the advertisement was seen, who the sponsor of the advertisement is, how the advertisement was added to the reference list 400, and so forth. The notes field 430 may also comprise user-added data such as a particular note as to why the user found the advertisement interesting (e.g., there is a particular actor in this movie whom the user likes). Such note data may be provided through a virtual keyboard or similar text-entry interface. Voice recognition may also be utilized whereby the notes field 430 may comprise recorded audio information generated by the user through, for example, a USB microphone or textual information transcribed from such audio information.

Advertisement identifier 410 may comprise a hyperlink to additional information about the product or service in the associated advertisement that caused the generation of the identifier 410. For example, a user may select an identifier 410 from the reference list 400 via a controller device. The link may then cause the launching of a web browser or other interface tool such that more detailed data about the particular service or product may be provided. This link may, in some instances, lead directly to the product manufacturer or service provider's website as may occur over a network connection. Upon arrival, the user may then peruse the website or other data portal of the service/product. In this way, the user may learn more about the appropriate service/product or make a purchase. Selecting a particular identifier 410 may also lead to a third-party site where similar or identical information about a product or service may be provided.

In some instances, the aforementioned third-party site may be a shopping portal such as Amazon.com. In these instances, the user may then begin a commercial transaction to purchase the product. In one embodiment, user data as may be stored on a memory card. Alternatively, user data may be made accessible due to, for example, a user having logged onto the network and certain data having been stored in a 'cookie.' This user data may automatically be populated into an order form (e.g., name, billing address, etc.) in order to expedite the purchase. In other instances, the third-party site may be a consumer review type website or portal. On such a site, information about a product or service as generated by actual users/purchasers of the particular service or product may be provided and/or reviewed.

In other instances, selecting the identifier 410 may lead to the option for the manufacturer or an intermediary party to provide more information about the product or service. This information may be provided via an alternate communications medium. For example, the user may request information via e-mail or direct mail. The user may further request informative brochures or videos or a call from a customer service representative. Such an exchange may further occur on-line via, for example, a VoIP exchange or a textual chat session.

Data may be accessed over a network (e.g., the Internet) or via various sites hosted by manufacturers, service providers or other third-parties. Data may also be retained and accessed locally. For example, if a particular software title on a CD-ROM is embedded with particular advertisements, additional information about products in those advertisements may also be embedded on the CD. Alternatively, the information may be located in an alternative local storage medium. That data may have been accessed over a network during a download or update procedure not necessarily related to the particular viewing of any given advertisement. Notwithstanding, such information may be obtained concurrently with advertisement viewing as well.

Figure 5:
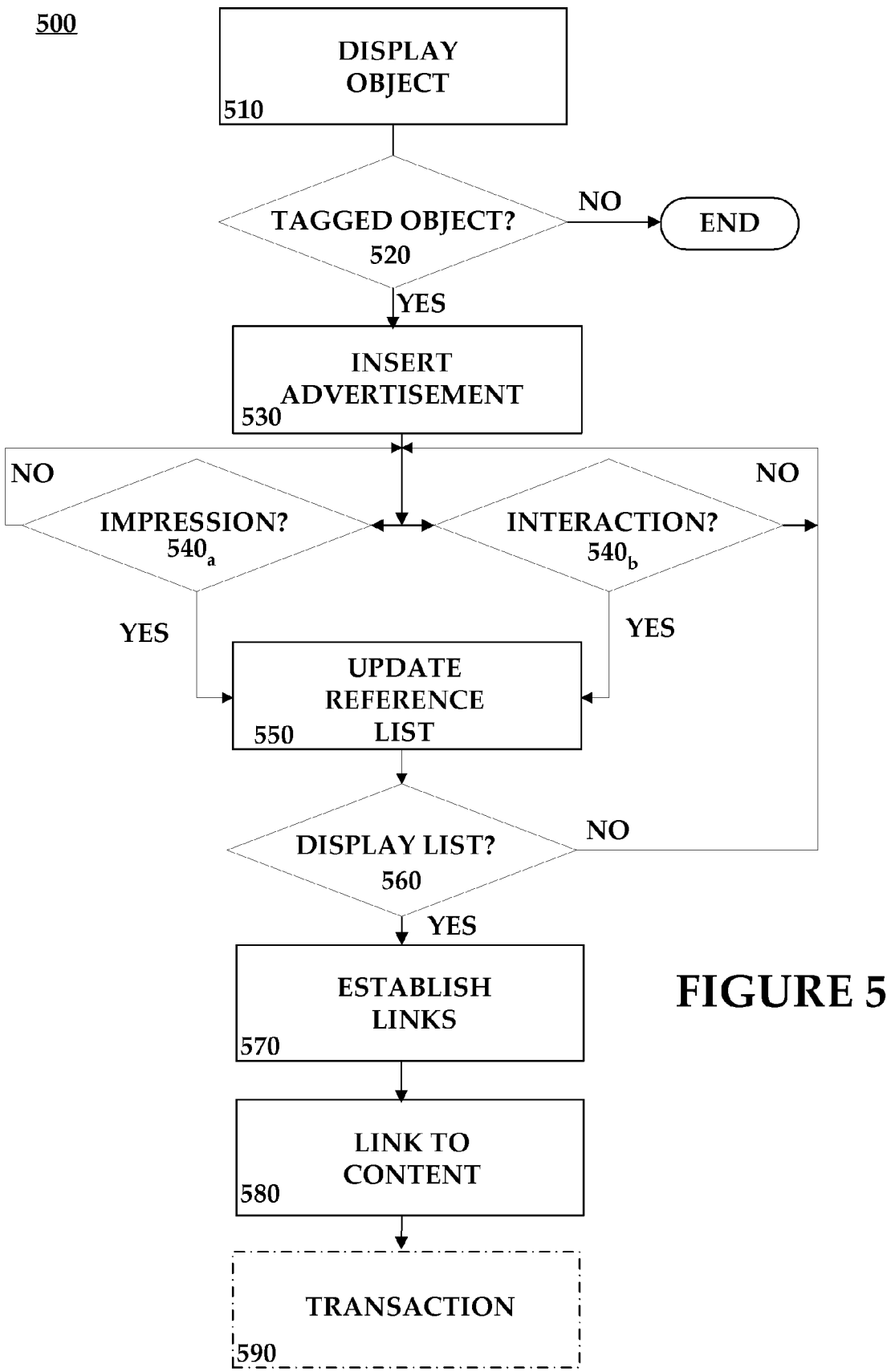
FIG. 5 illustrates an exemplary method for populating an advertisement reference list in accordance with one embodiment of the present invention.

FIG. 5 illustrates an exemplary method 500 for populating an advertisement reference list in accordance with one embodiment of the present invention. The steps identified in FIG. 5 (and the order thereof) are exemplary and may include various alternatives, equivalents, or derivations thereof including but not limited to the order of execution of the same. The steps of the process of FIG. 5 (and its various alternatives) may be embodied in hardware or software including a machine-readable medium (e.g., optical disc, memory card, carrier waves, etc.) comprising instructions executable by a machine such as the processor of a computing device.

In step 510, an object may be displayed in a digital environment, for example, on a billboard (100) like that described in FIG. 1A. In step 520, a determination may be made as to whether that object comprises a 'tagged' area (e.g., 110 in FIG. 1A) wherein certain advertisement data may be implemented, inserted, or otherwise displayed. Depending on a particular advertising network, the nature of the software being executed, and the like, certain advertisement content may be displayed in the tagged area (110) as in FIG. 1B (120) in step 530.

In step 540a, a determination may be made as to whether an impression of that advertisement content 120 has occurred. An advertisement impression may occur through any of the different methodologies described above and may be controlled by an advertising client in the particular game software and/or in conjunction with a similar client on a gaming or other digital consumer electronics device. In alternative (or optional additional) step 540b, a determination may be made as to whether an interaction with the advertisement content 120 has occurred. Depending on the particular advertisement and metadata in the 'tagged' area (110), different interaction determinations may be made depending on the particular advertisement and/or area in which the advertisement is displayed.

Once an impression has been made, and/or an interaction detected, the advertising client may recognize certain metadata embedded in the 'tagged' area and/or the advertisement currently being rendered. The advertising client may report that information to a reference list generation module (FIG. 6) such that an advertisement identifier 410 may be added to the aforementioned reference list 400 in step 550. In some embodiments, the advertising client may be a part of the advertisement reference list module 655 of FIG. 6 or vice versa.

In some embodiments of the present invention, an advertiser may wish to have their particular name/product as is reflected by an advertisement identifier 410 added to the reference list 400 at any cost. Through this addition, a user may learn more information about a particular product or service. In other embodiments, a premium fee may be charged to particular advertisers. In such an embodiment, the addition of the advertiser's name (via advertisement identifier 410) to an advertisement reference list 400 may provide somewhat exclusive and focused contact with the user. In these cases, the appearance of an advertisement identifier 410 on a reference list may provide for the imposition of a fee charged to the advertiser. This fee may reflect the benefit of the advertisement having been seen by the user. Alternatively, a fee may be charged to the advertiser in that their advertisement may have been seen in a closed, focused context. This focused context may make the strength and value of the impression, in general, all the more worthwhile and valuable.

Various pricing structures may be implemented in the present invention. These pricing structures may be implemented with regard to the ease of viewing/interacting with an advertisement (e.g., particular settings with regard to an advertisement impression area or line-of-sight setting). These pricing structures may also be reflective of the number of times an advertisement appears. Pricing structures may also take into consideration limitations with regard to population of the reference list 400, particular placement of the reference list 400, availability of ancillary data on that list, and other limitations as to linking, purchases, third-party comments, and so forth.

It should be noted that the advertisement reference list 400 may be used in contexts other than video games. For example, the advertisement reference list 400 may also be used in digital cinema, DVDs and other forms of digital media. Other alternatives, equivalents, and derivations thereof may also implement the aforementioned advertisement list 400 such as HD-DVD and Blue-Ray discs. In these instances, tagged assets may automatically cause the addition of an advertisement identifier 410 to the reference list 400. That is, the mere depiction of a tagged asset (110) and an advertisement thereon (120) on the screen may cause the reference list 400 to be updated.

Further, televisions with Internet connections and HD television may allow for this interaction with an advertisement reference list 400 in a television show via the user's television. Generation of an advertisement reference list 400 may occur in conjunction with the use of the aforementioned Cell Processor. For example, a picture window may be displayed through interaction with, for example, an input device. The picture window may allow the user to go to a link of advertisement data related to the show that the user was just watching. In this way, it may become possible for a network-enabled television to download in-show advertisement as appropriate, which may be local, regional, or national.

In step 560, a further determination may be made as to whether to the advertisement reference list 400 and its various identifiers 410 should be displayed to the user. This display may be integrated into the game environment. The display may also be a separate screen or a pop-up window that appears in the environment. The user may expressly call-up the reference list 400 through any variety of controller commands. Similarly, the reference list 400 may be displayed during game scene loading, at the end of a game level, or at the end of a game. Other means for causing the display of the list may be used. For example, the reference list 400 may be timer-based (i.e., the list appears every 'x' minutes). The reference list 400 may also appear in response to certain conditions in the gaming environment. For example, such a condition may include the player not being engaged in combat or the player traveling at less than a particular speed. Both of these exemplary situations may tend to indicate diverted attention of the user from the game environment may be possible and without a strong possibility of adverse incident in the game environment (e.g., no enemy attack or less likelihood of crashing a vehicle). The reference list 400 may also be displayed anytime a user 'pauses' game play or some other media utilizing the reference list (e.g., a DVD). Display control of the reference list 400 may be overseen by the reference list module of FIG. 6 (below). User preference may also be used to determine when the advertisement reference list 400 is displayed. For example, the user may set the display of the reference list 400 subject to one or more of the aforementioned display situations in addition to alternatives, equivalents, and derivations thereof.

In step 570, various links to content related to the advertisement identifier 410 may be established. These links may be offered to the user in step 570 as a part of the advertisement identifier 410 (e.g., a hyperlink or, alternatively, a separate link listing). These links may also be offered in addition to any ancillary advertisement data 420. In step 580, a user may be linked to various other content sources via a user selection to learn more about a product or service. In step 590, an optional transaction may commence. This transaction may be commercial in nature with regard to the purchase of a particular product and/or service or may simply constitute a request for more information through any variety of different communications mediums. Certain pre-fetching methodologies may be used wherein certain content is pre-fetched from a particular resource (e.g., a content server) before the content is requested in order to accelerate download and display.

In some embodiments of the present invention, a user may be granted access to restricted content through, for example, accessing data about an advertisement. The various categorizations of restricted content (e.g., video game, advertisement, or bonus content) and examples thereof (both of which are discussed herein) are exemplary. Restricted content may include various alternatives, equivalents, or derivations thereof as will be understood by those skilled in the art. As such, various changes may be made and equivalents may be substituted with respect to restricted content without departing from the spirit and scope of the present invention.

Restricted content may include additional video game content. Such content may sometimes be referred to as 'Easter Eggs.' This content may include—but is not limited to—secret or additional game 'levels,' special weapons, special powers, and special characters or avatars.

Restricted content may also include content often referred to as 'bonus content.' Bonus content may be associated with—but not limited to—DVDs, CDs, and other media that allow for the playback of program content such a movies, television shows, and music. The bonus content may include, for example, interviews with cast members, deleted scenes, previews for upcoming episodes of television shows or sequels to movies, or unreleased music tracks on a CD.

Restricted content may also include additional advertising content such as videos, links to protected web sites (e.g., those that require a keyed URL), and opportunities to receive samples of upcoming products before widespread market release. The restricted advertising content may, in some embodiments, appear in the digital environment (e.g., as a billboard or a commercial broadcast over a television or radio). The restricted advertising content may, in other embodiments be accessed through reference list 400 along with other advertisement identifiers.

For example, the restricted content may be added to the list as a new advertisement identifier. In such an example, the user may be informed of the addition of the new advertisement identifier to the reference list 400 through a pop-up window or some other communications means (e.g., an audible notification). The user may then review the new advertisement data in a fashion that may be similar to other identifiers on the reference list 400. In some embodiments, however, the user may be informed that new advertisement data (the formerly restricted content) is present on the reference list 400 or in the digital environment but information relating to the sponsor or exact locale of this new information may be specifically excluded from that notification. In this fashion, the user may be forced to search for the new advertisement data or other 'unlocked' restricted content.

By forcing the user to actively search for this new information in the reference list 400, the user may encounter other advertisement identifiers and/or advertisement data that was previously missed and/or ignored. The searching activity of the user may be tracked with respect to new advertisement impressions that are generated through the searching, access to, or interaction with various advertisement identifiers and/or advertisement data on the reference list 400. These new advertisement impressions and/or interactions may be added to the reference list 400 as appropriate and as if they occurred absent the presence of the unlocked restricted content.

In one exemplary embodiment, the restricted content may be unlocked but subject to the user generating a predefined number of advertisement impressions. That is, the restricted content may now be available to the user but will require the user to be subjected to (for example) ten advertisement impressions in the reference list 400. The predefined number of advertisement impressions may be with regard to products and/or services associated with the unlocked restricted content; for example, products and/or services offered by the same manufacturer or distributor. The predefined number of impressions may also be unassociated with any particular product and/or service and imposed simply to generate additional advertisement impressions for an entity that may run a digital environment-based advertisement network and receive payment for each impression generated regardless of a sponsor thereof.

Similar results may be achieved by placement of the unlocked restricted content in the digital environment. As a result of this placement of the restricted content in the digital environment, the user may be encouraged to re-play a game, re-watch a movie, or re-listen to a CD. The user, through this repeated activity in the digital environment may encounter advertisements and/or advertisement data that may have been previously missed and/or ignored.

Unlocking the restricted content may occur, as reference above, as a result of the user accessing data about an advertisement. The data may include the advertisement itself or information about a particular product or service. This data may be from the product or service provider or from a third-party such as a distributor (e.g., Amazon.com). Access to the advertisement data may be conditioned upon exposure to the advertisement or advertisement data for a particular period of time (e.g., viewing at least 20 seconds of a 30 second advertisement video). Access may also be conditioned upon particular user interactions such as clicking on links, providing user information, participating in polls, and the like. Activities that result in a grant of access to restricted content may include various alternatives, equivalents, or derivations thereof as will be understood by those skilled in the art. As such, various changes may be made and equivalents may be substituted with respect to accessing advertisement and advertisement data for the purpose of gaining access to restricted content without departing from the spirit and scope of the present invention.

As a result of having accessed an advertisement or advertisement data, the user may then be provided with a variety of means to gain access to the restricted content. For example, the user may be given a password by a sponsor of the advertisement data. The sponsor may be the product or service provider or a third-party such as a distributor. Through entry of the password in response to a query mechanism as may be provided by the reference list 400 or some other menu as may be generated by, for example, a software application on a computer readable medium, the restricted content may be unlocked. A keyed URL may also be used in a similar fashion with respect to a Web browser.

Unlocking of the restricted content may also be the result of a 'cookie' being placed on a computing device displaying the advertisement or data about the advertisement. A cookie, as in known in the art, may include a parcel of text that may be used for authentication of a device or application with respect to accessing certain information. The cookie may be provided by a sponsor of the advertisement or data about the advertisement.

Various alternatives, equivalents, or derivations of the aforementioned unlocking mechanisms will be understood by those skilled in the art. As such, various changes may be made and equivalents may be substituted with respect to unlocking restricted content without departing from the spirit and scope of the present invention.

In an additional embodiment of the present invention, a user may be granted access to a product bundle following the completion of a commercial transaction. For example, a user may (through reference list 400) access an advertisement or associated advertisement data about a product or service. That associated data may include an offer to purchase a particular product or service. Upon consummating the transaction (e.g., providing payment information), the user may be granted access to a bundle of products or services. This bundle of products or services may or may not be related to the purchased product or services. This bundle of products or services may not be available for purchase without making the aforementioned commercial transaction. In this manner, making one purchase may make it possible for the user to engage in additional purchases or commercial transactions.

This product bundle may be identified to the user as now being available in the reference list 400. The user may be directed specifically to this bundle through a link provided to the user or some other indicia of where to find the bundle. Alternatively, the user may be required to search for the bundle as has been discussed with regard to accessing other unlocked restricted content such that additional advertisement impressions may be generated.

Figure 6:
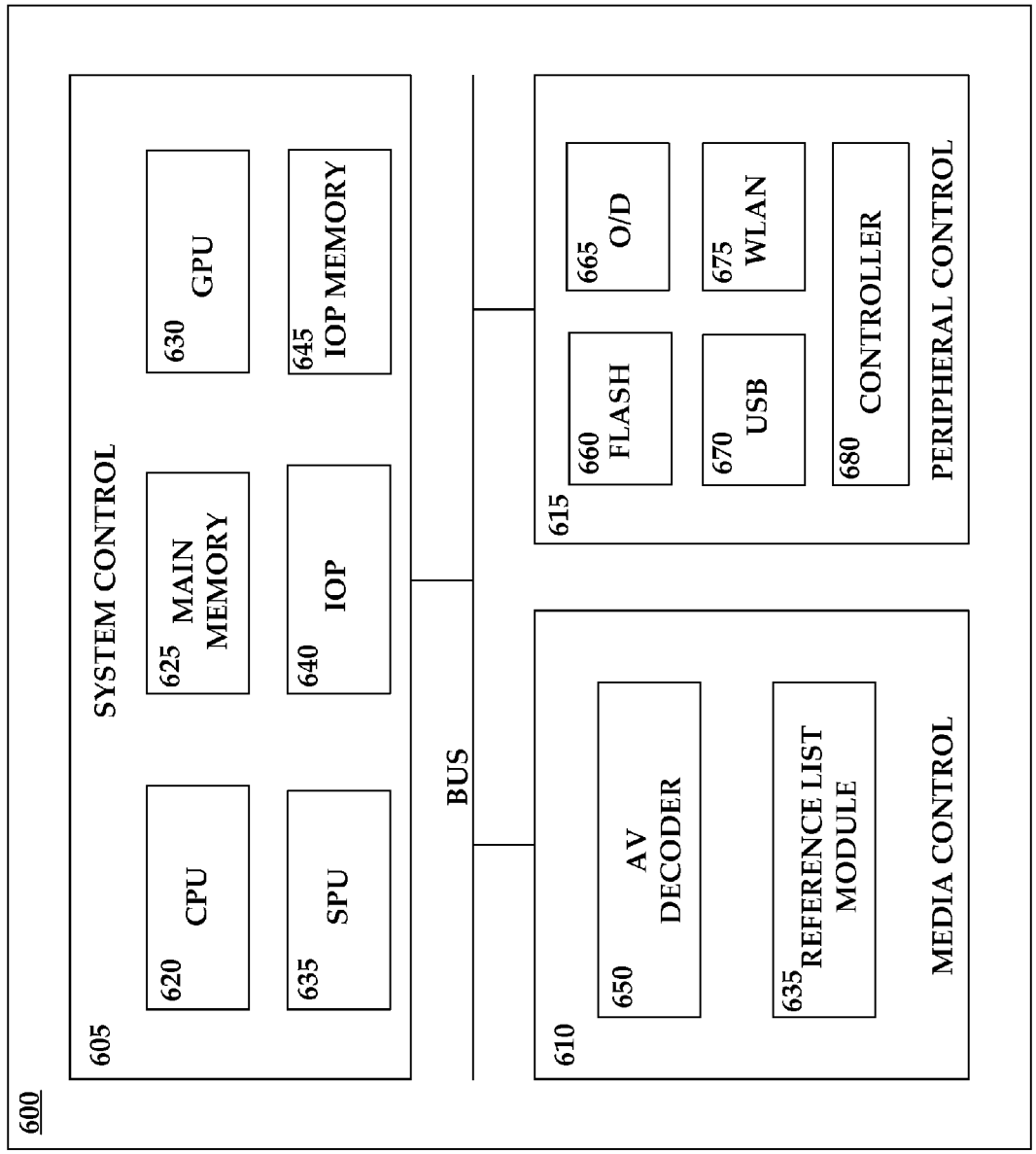
FIG. 6 illustrates an exemplary system for generating an advertisement reference list in accordance with an embodiment of the present invention.

FIG. 6 illustrates an exemplary system 600 for generating an advertisement reference list in accordance with an embodiment of the present invention. The elements identified in FIG. 6 are exemplary and may include various alternatives, equivalents, or derivations thereof. The system 600 of FIG. 6 may be implemented in any number of client devices including but not limited to a portable media device or cellular phone, a home entertainment system such as a video game console. The system 600 may also be implemented in any variety of online gaming devices including desktop and laptop computers.

The exemplary system 600 may comprise system control 605, media control 610, and peripheral control 615. System control 605 may be responsible for fundamental system operations (e.g., start-up, graphic rendering, input/output control, and so forth). Media control 610 may be responsible for handling various audio and video formats including advertisements. Peripheral control 615 may be responsible for the interface of various peripherals with the device.

Various combinations of hardware, software, and computer-executable instructions (e.g., program modules and engines) may be utilized with regard to system control 605, media control 610, and peripheral control 615. Program modules and engines may include routines, programs, objects, components, data structures, and the like that perform particular tasks or implement particular abstract data types. Computer-executable instructions and associated data structures represent examples of the programming means for executing steps of the methods and implementing particular system configurations disclosed herein. Various alternatives, equivalents, or derivations thereof are envisioned in the practice of the present invention.

System control 605 may comprise a central processing unit (CPU) 620, main memory 625, a graphics processing unit (GPU) 630, sound processing unit (SPU) 635, input/output processor (IOP) 640, and IOP memory 645. The various controls (605, 610, and 615) and the various components therein (e.g., CPU 620 and main memory 625) may be communicatively coupled via a series of buses both dedicated and shared.

CPU 620 may utilize a dual-core 32-bit MIPS architecture although various other processor architectures may be utilized, including those disclosed in U.S. patent publication Ser. No. 2002-0138637 for "Computer Architecture and Software Cells for Broadband Networks," the disclosure of which is incorporated herein by reference. CPU 620 may execute programs stored in an operating system read only memory (OS ROM) (not shown) and main memory 625. Main memory 625 may contain pre-stored programs and may also contain programs transferred via IOP 640 from any variety of interfaces controlled by peripheral control 615 (e.g., from an optical disk via optical disk controller interface 665). IOP 640 may control various exchanges between CPU 620 and GPU 630 as well as media control 610 and the aforementioned peripheral control 615. GPU 630 may execute drawing instructions from the CPU 620 and/or media control 610 to produce images for display on the client device. SPU 635 may execute instructions and process data to produce sound signals that are output on an audio device (not shown) that may be coupled to or otherwise integrated with device 630.

Media control 610 may be responsible for handling various audio and video formats as may be introduced to a client device. An exemplary AV decoder 650 and reference list generation module 655 are disclosed in the present exemplary embodiment. Media control 610 may further comprise enhanced dynamic random access memory (not shown) and a virtual machine environment (VME) (also not shown) for implementing certain emulation environments to isolate a particular media application from the actual hardware architecture of the device (e.g., an execution 'sandbox').

Through media control 610, a client device may be able to display still images, audio, and video as may be introduced through a variety of peripherals under the control of peripheral control 615 and working in conjunction with CPU 620 and GPU 630. In an exemplary embodiment of the present invention, media control 610 may implement various audio formats such as MP3, ATRAC3, WMA, WAV, MP4, and AAC. Media control 610 may also implement a variety of video formats including MPEG-4 Part 2 as well as H.264/AVC. Still images may also be implemented through media control 610 in formats such as JPEG, GIF, BMP, TIF, and PNG. Various alternative, equivalent, or derived formats for audio, video, still-image and combinations of the same are envisioned in the practice of the present invention.

AV decoder 650 may decompress and/or decode a variety of media as may be introduced by peripheral control 615. Decompressed media may be temporarily stored in eDRAM (not shown) prior to its subsequent rendering and/or audible emission by the device.

Peripheral control 615 may control a variety of peripheral input/outputs that may be present on the client device. For example, the client device may utilize flash memory as may be introduced through flash memory interface 660. Optical disc interface 665 may provide for the introduction of data through any variety of optical discs such as CD-ROM or DVD-ROM but may also include proprietary formats such as the Universal Media Disc from Sony Corporation. Peripheral control 615 may further include a USB 2.0 interface 670, which may further include a mini-B interface. The client device may also comprise a WLAN interface 675 such that device can exchange data with other computing devices utilizing an 802.11x wireless protocol.

Other data input formats are well within the scope of the present invention, including an InfraRed interface conforming to IRDA standards or a Memory Stick™ interface, the Memory Stick™ being an IC-based recording medium from Sony Corporation. The client device may also comprise an IEEE 1394 ('FireWire') connection in addition to Bluetooth and Ultra Wideband (UWB) radio technology interfaces. Certain embodiments of the present invention may utilize a network adaptor, which may offer an Ethernet connection and/or telephony connection.

Peripheral control 615 may also comprise controller interface 680 that may allow for the introduction of instructions through a control device, for example, a joystick, directional buttons, and other control buttons. Various other control input methodologies may be used such as a USB-camera like the Eye Toy® from Sony Computer Entertainment Inc. It should be noted that, in some instances, a control device (e.g., the aforementioned USB-camera) may sometimes be introduced to the device through an additional peripheral input such as USB interface 670.

From metadata in a tagged region (110) or an actual advertisement (120) inserted into a tagged region or a set of data associated therewith, reference list generation module 655 may identify certain information about the advertisement (120). Through this identification, the reference list generation module 655 may import necessary or desired information into the advertisement reference list 400. This information may include the name of the advertiser, the nature of the product being advertised, or a particular display format for the advertisement identifier 410 to be rendered in the advertisement reference list. This information may also include a hyperlink to be established between the advertisement identifier 410 and any additional information sources (e.g., a website). The advertisement reference list module 655 (via metadata or other associated data) may further identify any ancillary advertisement data 420 such as logos, other graphics, applets, and the like.

The reference list module 655 may then manage the acquisition of this additional information from the appropriate resource. For example, an advertisement that is to be inserted may be accompanied by a file constituting various ancillary data. The ancillary data may be stored in a memory buffer or other memory means (e.g., flash memory) and may be accessed as needed. This information may, alternatively, be embedded on a CD-ROM that is being read by the client device. Similarly, the module 655 may need to access a communications network in order to pull the needed data from a remote server or other memory store.

Reference list module 655 may operate in conjunction with the various rendering hardware and software of the system 600 such as AV decoder 650, GPU 630, CPU 620, and SPU 635 to display the reference list 400, the advertisement identifiers 410 on that list, and any ancillary advertisement data 420. Advertisement reference list module 655 may further interact with WLAN interface 675 or some other network interface (not shown) in order to establish a network connection to obtain certain ancillary data or to other a link to another source of data once an advertisement identifier 410 is selected by a user from the advertisement reference list 400.

Advertisement reference list module 655 may further operate with the advertisement client (not shown) in order to determine whether an impression of an advertisement has been made. Advertisement reference list module 655 may further operate with the advertisement client to determine whether there has been some interaction with an advertisement that would warrant the addition of the advertisement reference identifier 410 to the reference list 400. The advertisement client may be embodied locally on the system 600 or through software being accessed by the system 600. In some embodiments of the present invention, the advertisement client may be embedded in the advertisement metadata of a tag or advertisement. Through embedding the client, particular specifications may be imposed with regard to advertisement impressions. Advertisement client may also be a part of module 655 as has been previously noted.

Advertisement reference module 655 may further operate to report certain interactions with an advertisement to an advertiser (e.g., feedback data). For example, a reference list 400 may be generated but a user may never select an identifier 410 on that list 400. While selecting an identifier 410 may provide an indicator to the advertiser or product manufacturer that an impression has been made by virtue of the user being redirected to a particular website (e.g., the redirection of the user may be accompanied by data concerning the cause and source of the redirection), merely populating the reference list 400 may not. In these instances, advertisement reference module 655 may generate data concerning the addition of the identifier 410 to the list 400 as the result of an interaction and/or impression and report that data to a particular advertiser. Instructions pertaining to generating this data may be embedded in a particular tag or advertisement inserted into the tag.

While the present invention has been described with reference to exemplary embodiments, it will be understood by those skilled in the art that various changes may be made and equivalents may be substituted for elements thereof without departing from the true spirit and scope of the present invention. In addition, modifications may be made without departing from the essential teachings of the present invention. Various alternative systems may be utilized to implement the various methodologies described herein and various methods may be used to achieve certain results from the aforementioned systems.

What is claimed is:

1. A method for generating an advertisement reference list based on user impressions of an advertisement, the method comprising:
   displaying an advertisement in a digital environment;
   executing instructions stored in memory, wherein execution of the instructions by a processor:
      identifies a location of a point of view associated with the user, the location being identified within a defined impression area in the digital environment,
      evaluates a line-of-sight from the location within the defined impression area to the displayed advertisement to determine a level of obstruction, and
      confirms an existence of an advertisement impression of the displayed advertisement, the confirmation based on the determined obstruction level of the line-of-sight to the displayed advertisement; and
   adding at least one advertisement identifier associated with the advertisement to a reference list stored in memory, the addition of information occurring in response to the confirmation of the advertisement impression.

2. The method of claim 1, further comprising displaying the reference list, the reference list including the at least one advertisement identifier.

3. The method of claim 2, wherein the at least one advertisement identifier is linked to data about the advertisement.

4. The method of claim 3, wherein a user is granted access to restricted content in the digital environment based on the user accessing the data about the advertisement.

5. The method of claim 4, wherein the restricted content is accessed through entry of a password, the password having been provided by a sponsor of the data about the advertisement.

6. The method of claim 4, wherein the restricted content is accessed by identifying a cookie at a device associated with the display of the data about the advertisement, the cookie having been provided by a sponsor of the data about the advertisement.

7. The method of claim 4, wherein the restricted content is accessible by the user only after encountering a predefined number of advertisement impressions in the digital environment.

8. The method of claim 4, wherein the restricted content is additional video game content.

9. The method of claim 4, wherein the restricted content is additional advertisement content.

10. The method of claim 9, wherein the additional advertisement content is associated with a new advertisement identifier added to the reference list.

11. The method of claim 10, further comprising informing the user of the addition of the new advertisement identifier to the reference list.

12. The method of claim 11, wherein informing the user of the addition of the new advertisement identifier to the reference list excludes identifying a sponsor of the new advertisement identifier, whereby the user is required to search the advertisement list for the new advertisement identifier and search activity of the user is tracked with regard to generation of impressions of other advertisement identifiers on the reference list.

13. The method of claim 4, wherein the restricted content is bonus content associated with program content.

14. The method of claim 4, wherein the grant of access to restricted content based on user access to the data about the advertisement is subject to a time of exposure to the data about the advertisement.

15. The method of claim 4, wherein the grant of access to restricted content based on user access to the data about the advertisement is subject to a specific user interaction with the data about the advertisement.

16. The method of claim 3, wherein the data about the advertisement is accessed directly from the manufacturer or provider of a product or service referenced in the advertisement.

17. The method of claim 16, further comprising providing additional information about the product or service in another communications medium.

18. The method of claim 3, wherein the data about a product or service referenced in the advertisement is accessed from a third-party.

19. The method of claim 18, further comprising commencing a commercial transaction with the third-party to obtain the product or service referenced in the advertisement.

20. The method of claim 18, wherein the data about the product or service referenced in the advertisement is consumer feedback about the product or service.

21. The method of claim 19, wherein a user is granted access to a product bundle based on the user completing the commercial transaction.

22. The method of claim 21, wherein the product bundle is associated with a new advertisement identifier in the reference list.

23. A method for generating an advertisement reference list based on user interactions with an advertisement, the method comprising:
    displaying an advertisement in a digital environment;
    executing instructions stored in memory, wherein execution of the instructions by a processor:
        identifies a location of a point of view associated with the user, the location being identified within a defined impression area in the digital environment,
        evaluates a line-of-sight from the location within the defined impression area to the displayed advertisement to determine a level of obstruction, and
        confirms a user interaction with the advertisement, the confirmation based on the determined obstruction level of the line-of-sight when the user interacts with the displayed advertisement; and
    adding at least one advertisement identifier associated with the advertisement to a reference list stored in memory, the addition of information occurring in response to the confirmation of the advertisement interaction between the user and the displayed advertisement.

24. The method of claim 23, further comprising displaying the reference list, the reference list including the at least one advertisement identifier.

25. The method of claim 24, wherein the at least one advertisement identifier is linked to data about the advertisement.

26. The method of claim 25, wherein a user is granted access to restricted content in the digital environment based on the user accessing the data about the advertisement.

27. The method of claim 26, wherein the restricted content is accessed through entry of a password, the password having been provided by a sponsor of the data about the advertisement.

28. The method of claim 26, wherein the restricted content is accessed by identifying a cookie at a device associated with the display of the data about the advertisement, the cookie having been provided by a sponsor of the data about the advertisement.

29. The method of claim 26, wherein the restricted content is accessible by the user only after encountering a predefined number of advertisement impressions in the digital environment.

30. The method of claim 26, wherein the restricted content is additional video game content.

31. The method of claim 26, wherein the restricted content is additional advertisement content.

32. The method of claim 31, wherein the additional advertisement content is associated with a new advertisement identifier added to the reference list.

33. The method of claim 32, further comprising informing the user of the addition of the new advertisement identifier to the reference list.

34. The method of claim 33, wherein informing the user of the addition of the new advertisement identifier to the reference list excludes identifying a sponsor of the new advertisement identifier, whereby the user is required to search the advertisement list for the new advertisement identifier and search activity of the user is tracked with regard to generation of impressions of other advertisement identifiers on the reference list.

35. The method of claim 26, wherein the restricted content is bonus content associated with program content.

36. The method of claim 26, wherein the grant of access to restricted content based on user access to the data about the advertisement is subject to a time of exposure to the data about the advertisement.

37. The method of claim 26, wherein the grant of access to restricted content based on user access to the data about the advertisement is subject to a specific user interaction with the data about the advertisement.

38. The method of claim 25, wherein the data about the advertisement is accessed directly from the manufacturer or provider of the product or service referenced in the advertisement.

39. The method of claim 38, further comprising providing additional information about the product or service in another communications medium.

40. The method of claim 25, wherein the data about the product or service referenced in the advertisement is accessed from a third-party.

41. The method of claim 40, further comprising commencing a commercial transaction with the third-party to obtain the product or service referenced in the advertisement.

42. The method of claim 40, wherein the data about the product or service referenced in the advertisement is consumer feedback about the product or service.

43. The method of claim 41, wherein a user is granted access to a product bundle based on the user completing the commercial transaction.

44. The method of claim 43, wherein the product bundle is associated with a new advertisement identifier in the reference list.

45. The method of claim 23, wherein the interaction is direct.

46. The method of claim 23, wherein the interaction is indirect.

47. A system for generating an advertisement reference list, the system comprising:
    an advertisement source; and
    a computing device configured to:
        receive advertisement data from the advertisement source;
        render the advertisement data in a digital environment;

identify a location of a point of view associated with the user, the location being identified within a defined impression area in the digital environment, evaluate a line-of-sight from the location within the defined impression area to the displayed advertisement to determine a level of obstruction, and confirm a communication of the advertisement data to an observer of the digital environment, the confirmation based on the determined obstruction level of the line-of-sight to the rendered advertisement; and generate a list of advertisement data communicated to the observer of the digital environment.

48. The system of claim 47, wherein the list of advertisement data communicated to the observer of the digital environment is linked to an additional information source, the additional information source associated with the advertisement data.

49. The system of claim 47, wherein the communication of the advertisement data occurs through an advertisement impression.

50. The system of claim 47, wherein the communication of the advertisement data occurs through an interaction with the advertisement data.

51. The system of claim 50, wherein the interaction is direct.

52. The system of claim 50, wherein the interaction is indirect.

53. The system of claim 47, wherein the digital environment is a video game.

54. A computer-readable storage medium, having embodied thereon instructions executable by a processor to perform a method for generating an advertisement reference list based on user impressions of an advertisement, the method comprising:

displaying an advertisement in a digital environment;

identifying a location of a point of view associated with a user, the location being identified within a defined impression area in the digital environment;

evaluating a line-of-sight from the location within the defined impression area to the displayed advertisement to determine a level of obstruction;

confirming the existence of an advertisement impression; and adding at least one advertisement identifier associated with the advertisement to a reference list, the addition of information occurring in response to the confirmation of an advertisement impression, the confirmation based on the determined obstruction level of the line-of-sight to the displayed advertisement.

55. A computer-readable storage medium having embodied thereon instructions executable by a processor to perform a method for generating an advertisement reference list based on user interactions with an advertisement, the method comprising:

displaying an advertisement in a digital environment;

identifying a location of a point of view associated with a user, the location being identified within a defined impression area in the digital environment;

evaluating a line-of-sight from the location within the defined impression area to the displayed advertisement to determine a level of obstruction;

confirming a user interaction with the advertisement; and adding at least one advertisement identifier associated with the advertisement to a reference list, the addition of information occurring in response to the confirmation of the advertisement interaction, the confirmation based on the determined obstruction level of the line-of-sight to the displayed advertisement.

\* \* \* \* \*